US 12,496,709 B2

(12) United States Patent
Ilch

(10) Patent No.: US 12,496,709 B2
(45) Date of Patent: Dec. 16, 2025

(54) INDUSTRIAL ROBOT

(71) Applicant: autonox Holding GmbH, Willstaett (DE)

(72) Inventor: Hartmut Herbert Ilch, Baden-Baden (DE)

( * ) Notice: Subject to any disclaimer, the term of this patent is extended or adjusted under 35 U.S.C. 154(b) by 0 days.

(21) Appl. No.: 18/283,105

(22) PCT Filed: Mar. 30, 2022

(86) PCT No.: PCT/DE2022/100247
§ 371 (c)(1),
(2) Date: Sep. 20, 2023

(87) PCT Pub. No.: WO2022/207039
PCT Pub. Date: Oct. 6, 2022

(65) Prior Publication Data
US 2024/0165792 A1  May 23, 2024

(30) Foreign Application Priority Data

Apr. 1, 2021 (DE) .................... 10 2021 108 472.5
Apr. 19, 2021 (DE) .................... 10 2021 109 857.2

(51) Int. Cl.
  *B25J 9/16* (2006.01)
  *B25J 9/00* (2006.01)
(52) U.S. Cl.
  CPC .......... *B25J 9/1623* (2013.01); *B25J 9/0051* (2013.01); *B25J 9/0072* (2013.01)
(58) Field of Classification Search
  CPC ....... B25J 9/0051; B25J 9/0072; B25J 9/1623
  See application file for complete search history.

(56) References Cited

U.S. PATENT DOCUMENTS 6,543,987 B2 * 4/2003 Ehrat .................... B25J 9/0051
                                                    414/735
9,505,126 B2 * 11/2016 D'Egidio ............... B25J 9/1623
(Continued)

FOREIGN PATENT DOCUMENTS

CH        715217 A2 *  1/2020  .......... B25J 19/0025
DE   10 2016 108 215 A1   11/2017
(Continued)

OTHER PUBLICATIONS

International Search Report in PCT/DE2022/100247, mailed Jul. 21, 2022.
(Continued)

*Primary Examiner* — Bobby Rushing, Jr.
(74) *Attorney, Agent, or Firm* — Von Rohrscheidt Patents

(57) ABSTRACT

An industrial robot with parallel kinematics includes a robot base, an effector carrier receiving an effector, a first actuating arm, a second actuating arm, and a third actuating arm, wherein each actuating arm is driven at one end and is received on the robot base and is movably connected with its other end to the effector carrier. The actuating arms are adapted to move the effector carrier translationally in three dimensions in space relative to the robot base. The first actuating arm and the second actuating arm are connected to the effector carrier via lower arm joints. All lower arm joints of the first and second actuator arms lie in an effector carrier plane. The effector carrier is secured against rotation about a z-axis perpendicular to the effector carrier plane by the third actuating arm.

22 Claims, 19 Drawing Sheets

(56) References Cited

U.S. PATENT DOCUMENTS

Figure 1:
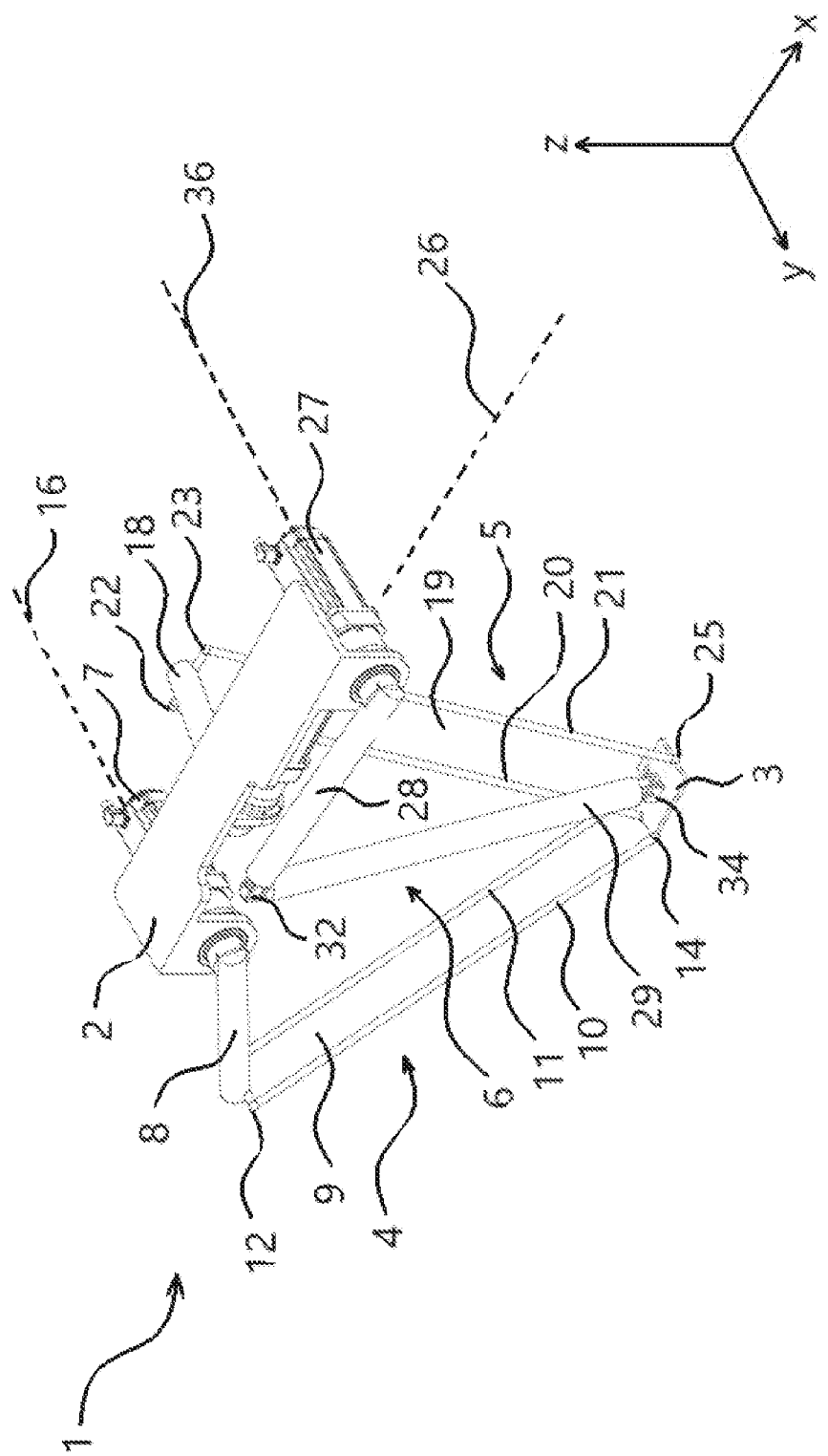

| | | | | |
|---|---|---|---|---|
| 10,369,692 | B2* | 8/2019 | Nakanishi | B25J 9/1065 |
| 2011/0100145 | A1* | 5/2011 | Feng | B25J 9/0051 |
| | | | | 74/490.01 |
| 2012/0171383 | A1* | 7/2012 | Christensen | B05B 13/0426 |
| | | | | 427/427.3 |
| 2015/0367505 | A1* | 12/2015 | Ruiz Garcia | B25J 9/101 |
| | | | | 134/167 C |
| 2019/0061144 | A1 | 2/2019 | Yamamoto | |
| 2019/0159402 | A1 | 5/2019 | D'Arrigo et al. | |
| 2020/0376653 | A1* | 12/2020 | Ootani | B25J 9/107 |

FOREIGN PATENT DOCUMENTS

| | | | | |
|---|---|---|---|---|
| DE | 10 2016 112 870 A1 | | 1/2018 | |
| DE | 10 2016 115 602 A1 | | 3/2018 | |
| DE | 102016215744 A1 | * | 3/2018 | |
| DE | 10 2017 003 248 A1 | | 10/2018 | |
| EP | 2835226 A1 | | 2/2015 | |
| KR | 20190000910 U | * | 4/2019 | |
| KR | 102174924 B1 | * | 11/2020 | B25J 9/144 |

OTHER PUBLICATIONS

Lung-Wen, Tsai et al., "Comparison Study of Architectures of Four 3 Degree-Of-Freedom Translational Parallel Manipulators", Proceedings of the 2001 IEEE International Conference on Robotics & Automation, ICRA 2001, Seoul, Korea, May 21-26, 2001; [Proceedings of the IEEE International Conference on Robotics & Automation], New York, NY, IEEE, US, vol. 2, May 21, 2001, pp. 1283-1288, XP010550325, total of 6 pages.

Zhang, Dan et al., "Portable Multi-axis CNC: A 3-CRU Decoupled Parallel Robotic Manipulator", Intelligent Robotics and Applications—Third International Conference, ICIRA 2010, Proceedings—Springer Verlag, vol. 6424, Nov. 10, 2010, pp. 418-429, XP019156071, total of 12 pages.

Briot, Sébastien et al., "Pantopteron: a New Fully-Decoupled 3-DOF Translational Parallel Robot for Pick-and-Place Applications", Journal of Mechanisms and Robotics, American Society of Mechanical Engineers, 2009, 1 (2). hal-00451879, Jan. 1, 2009, Retrieved from the Internet: https://hal.archives-ouvertes.fr/hal-00451879/document, [retrieved on Jul. 7, 2022], XP055939798, total of 10 pages.

German Search Report dated Feb. 22, 2022 in German Application No. 10 2021 108 472.5, with English translation of the relevant parts.

* cited by examiner

INDUSTRIAL ROBOT

CROSS REFERENCE TO RELATED APPLICATIONS

This application is the National Stage of PCT/DE2022/100247 filed on Mar. 30, 2022, which claims priority under 35 U.S.C. § 119 of German Application No. 10 2021 108 472.5 filed on Apr. 1, 2021 and German Application No. 10 2021 109 857.2 filed on Apr. 19, 2021, the disclosures of which are incorporated by reference. The international application under PCT article 21(2) was not published in English.

The invention is based on an industrial robot with parallel kinematics, comprising a robot base, with an effector carrier serving as a receptacle for an effector and with several actuating arms for moving the effector carrier.

Such industrial robots with parallel kinematics are used to move, position and/or process an object in space. They comprise a robot base arranged in a fixed position or on a movable platform and a movable effector carrier for holding an effector, such as a gripper, a tool, a camera or a machine element. At least two actuating arms are connected at one end to the robot base and at the other end to the effector carrier. Each actuating arm is moved by an associated drive arranged on the robot base. Movement of the actuating arms results in movement of the effector carrier. The effector carrier can also be referred to as a tool carrier or a platform. An effector can be placed on the effector carrier, such as a gripper for picking up an object or a tool for processing an object or a machine element, such as a bearing or a gear. For this purpose, the effector carrier is equipped with a receptacle for an effector. Through the coordinated movement of the driven actuating arms, an effector arranged on the effector carrier can be moved in space in a targeted manner in several dimensions. The actuating arms provide spatial parallelogram guidance of the effector carrier. In this process, all actuating arms contribute simultaneously and thus in parallel to the movement of the effector carrier. The resulting parallel kinematics allows fast and precise movement of the effector carrier and the effector arranged thereon. This movement is a translational movement of the effector carrier. If the industrial robot is equipped with three actuating arms, the movement is translational in three spatial directions. The movement has three degrees of freedom and can be described in a coordinate system with x, y and z axes. If the industrial robot is equipped with two actuating arms, the movement is translational in two spatial directions. In this case, the movement has two degrees of freedom and can be described in a coordinate system with x and z axes.

Examples of such robots are delta robots. They comprise at least two actuating arms. Preferably, three actuating arms are identically constructed and typically mounted at an angular distance of 120° to the robot base. The actuating arms have an upper arm section and a lower arm section, which are movably connected to each other. The upper arm section is also referred to as the upper arm. The lower arm section is also referred to as the lower arm. Each of the upper arm sections is driven by an arm drive, such as a motor-gear unit. The arm drives are arranged at the robot base. The motion of the upper arm sections is transferred to the effector carrier via the lower arm sections. The lower arm section usually has two parallel rods or struts running in the longitudinal direction of the arm section. One end of these rods is movably connected to the corresponding upper arm section and the other end is movably connected to the effector carrier. The two rods of a lower arm span a parallelogram.

To allow the rods to move the effector carrier in three dimensions in space, they are movably mounted on the upper arm and on the effector carrier so they can move about several geometric axes. Spherical joints or cardan joints are particularly suitable for this purpose. Since each strut is provided with two such joints, each lower arm has a total of four spherical joints or cardan joints. With three actuating arms, a total of 12 joints are required for the lower arms. This makes the setup complex and expensive. In addition, the movement of the effector carrier in three dimensions in space is overdetermined based on the three lower arms, each constructed with a parallelogram of two struts, with a total of 12 joints with multiple degrees of freedom. Two of the actuating arms allow movement in two dimensions, for example in the direction of an x-axis and a y-axis. However, they cannot prevent the effector carrier from rotating about a z-axis, that is orthogonal to the x-axis and y-axis. The third actuating arm provides stabilization of the effector carrier and movement of the effector carrier in the direction of the z-axis. However, it also comprises two struts and a total of four joints on the lower arm section for this purpose, although one strut and two joints should actually be sufficient. The three actuating arms are typically arranged on the robot base in such a way that the corresponding lower arms are attached to the effector carrier at the same distance in each case, with each actuating arm having an angular range of 120°. As a result, the working area is circular rather than rectangular.

The object of the invention is to provide an industrial robot with parallel kinematics that has a small number of joints for the lower arms, which enables a rectangular working area and in which a movement of the effector carrier in three dimensions in space is not overdetermined.

This object is solved by an industrial robot with the features of claim 1. The industrial robot has three actuating arms. Two of the actuating arms are identical or similar in construction. A third actuating arm is different in construction from the other two actuating arms. A first actuating arm comprises a first arm drive arranged on the robot base, a first upper arm coupled to the first arm drive, and a first lower arm, wherein the first lower arm is movably connected to the first upper arm via at least one first elbow joint and to the effector carrier via at least one first lower arm joint. The same applies to a second actuating arm. It comprises a second arm drive, a second upper arm, a second lower arm, at least one second elbow joint, and at least one second lower arm joint. These components are interconnected in correspondence to the first actuating arm. The first elbow joint, the second elbow joint, the first lower arm joint, and the second lower arm joint each have multiple degrees of freedom. This means that they provide a joint that is movable about multiple geometric axes. If the first actuating arm is provided with two first lower arm joints, these are arranged spatially offset from each other on the effector carrier so that they do not interfere with each other. The same applies to the second actuating arm if it is provided with two second lower arm joints. The first lower arm may comprise a rod or strut. Alternatively, the first lower arm may have two parallel struts or rods spanning a parallelogram. In this case, the first actuating arm is constructed substantially like the actuating arms of a typical delta robot. The same is true for the second actuating arm: it may have only one strut or rod, or it may have two parallel struts or rods spanning a parallelogram. The first actuating arm and the second actuating arm may both have identical structures, with both the first lower arm and the second lower arm each having two struts or rods in a parallelogram arrangement.

Alternatively, the first and second actuating arms may be of similar construction, with one of the two actuating arms having only one strut or rod on the lower arm and the other having two. In principle, an embodiment in which both the first actuating arm and the second actuating arm each have exactly one strut or rod as a lower arm is also possible.

The third actuating arm comprises an elongated arm section which is directly or indirectly coupled at one end to a third arm drive of the third actuating arm and which is connected at its other end to the effector carrier via at least one third lower arm joint. Thereby, the third lower arm joint preferably has exactly two degrees of freedom. It thus enables movement of the elongated arm section relative to the effector carrier in exactly two dimensions. The third arm drive is received at the robot base. The elongated arm section of the third actuating arm is provided with one or with two third lower arm joints.

The sum of the number of lower arm joints of the first actuating arm, the second actuating arm and the third actuating arm is at least three and at most five. Thus, two actuating arms may be equipped with two lower arm joints and one actuating arm may be equipped with one lower arm joint. Alternatively, all three actuating arms are equipped with only one lower arm joint. In principle, an embodiment in which two actuating arms are equipped with only one lower arm joint and one actuating arm has two or three lower arm joints is also possible. The number of lower arm joints is thus reduced compared to known delta robots.

Preferably, each lower arm joint is associated with a rod or strut of the associated lower arm. For example, if the first actuating arm has two first lower arm joints, it is advantageously equipped with two rods or struts forming the lower arm and spanning a parallelogram. Each of the two rods or struts is connected to exactly one lower arm joint. This applies accordingly to the second actuating arm and to the third actuating arm. The two rods or struts of the first actuating arm are preferably connected to the upper arm via two elbow joints. The same applies here for the second actuating arm.

The lower arm joints of the first actuating arm, the second actuating arm and the third actuating arm are arranged offset on the effector carrier. For example, the lower arm joints of the first and second actuating arms may be arranged on the sides of the effector carrier, and the at least one lower arm joint of the third actuating arm may be arranged on the side of the effector carrier facing the robot base. The centers of at least three of the first, second, and third lower arm joints span a plane referred to as the effector carrier plane. The effector carrier is moved only translationally by the three actuating arms. Rotation of the effector carrier must be prevented. A rotation of the effector carrier about a z-axis perpendicular to the effector carrier plane is prevented by the third actuating arm. Preferably, rotation of the effector carrier about the z-axis is prevented exclusively by the third actuating arm, the first actuating arm and the second actuating arm not contributing to this. In this way, the industrial robot according to the invention differs from known delta robots. In known delta robots, rotation about a z-axis perpendicular to the effector carrier plane is prevented by all actuating arms together. This is correspondingly true in known delta robots with respect to preventing rotation about an x-axis perpendicular to the z-axis and about a y-axis perpendicular to the z-axis. For this reason, the three actuating arms of known delta robots are preferably arranged with an angular separation of 120° at the robot base.

The third actuating arm generates an accelerating force on the effector carrier in the direction of the z-axis. An x-axis perpendicular to the z-axis and a y-axis perpendicular to the z-axis span an xy-plane, which is parallel to or coincides with the effector carrier plane. In a preferred manner, the first actuating arm generates an accelerating force in the x-axis direction on the effector carrier and the second actuating arm generates an accelerating force in the y-axis direction on the effector carrier. The x-axis may be oriented perpendicular to the y-axis. However, this is not necessarily the case. The three actuating arms are not each assigned an angular range of 120°, as is the case with known industrial robots, in order to move and stabilize the effector carrier. Rather, the first actuating arm and the second actuating arm can be connected to the effector carrier in such a way that the x-axis, the y-axis and the z-axis, along which the effector carrier experiences an accelerating force through the actuating arms, are each perpendicular to one another. This results in an essentially rectangular or cuboid working area of the industrial robot.

To prevent rotation of the effector carrier, the effector carrier must be secured not only against rotation about the z-axis, but also against rotation about the x-axis perpendicular to the z-axis and against rotation about the y-axis perpendicular to the z-axis, whereby the x-axis and the y-axis must be different but not necessarily perpendicular to each other. The following options are available for securing the effector carrier against rotation about the x-axis and about the y-axis:

1. the first actuating arm secures the effector carrier against rotation about the x-axis and the second actuating arm secures the effector carrier against rotation about the y-axis.
2. the first actuating arm secures the effector carrier against rotation about the x-axis and the third actuating arm secures the effector carrier against rotation about both the z-axis and the y-axis.
3. The third actuating arm secures the effector carrier against rotation about the x-axis, around the y-axis and around the z-axis.

To secure the effector carrier against rotation about the x-axis, the effector carrier can be held by means of two lower arm joints arranged offset on the effector carrier, the centers of the two lower arm joints lying on a straight line which is preferably perpendicular to the x-axis. These two lower arm joints may be two first lower arm joints. In this case, the first actuating arm secures the effector carrier against rotation about the x-axis. Alternatively, the third actuating arm may be equipped with two third lower arm joints whose centers lie on a straight line perpendicular to the x-axis. The same applies to securing the effector carrier against rotation about the y-axis. For this purpose, the second actuating arm can be equipped with two second lower arm joints whose centers lie on a straight line preferably perpendicular to the y-axis. Alternatively, the third actuating arm may be equipped with two third lower arm joints whose centers lie on a straight line preferably perpendicular to the y-axis.

The actuating arms stabilized the effector carrier in such a way that it cannot rotate about the z-axis and that it cannot tilt about the x-axis and the y-axis. It always remains aligned parallel to a predetermined plane. In particular, this plane can be a horizontal plane. The third actuating arm is connected to the effector carrier via the at least one third lower arm joint. If only one third lower arm joint is provided, it has exactly two axes around which it can be rotated. These two axes are referred to as lower arm joint axes. Since the third lower arm joint has exactly two lower arm joint axes and thus exactly two degrees of freedom, it allows the elongated arm section of the third actuating arm to follow a movement of the effector carrier in the x-direction and y-direction, which is initiated by the first actuating arm and by the second actuating arm. Since the third lower arm joint has no other degrees of freedom and the third lower arm joint is non-rotatably connected to the elongated arm section of the third actuating arm and to the effector carrier except for its two lower arm joint axes, rotation of the effector carrier about the z-axis orthogonal to the x-axis and to the y-axis is prevented by the third actuating arm. The third actuating arm prevents the effector carrier from rotating about a z-axis perpendicular to the effector carrier plane. It thus ensures torsional rigidity of the effector carrier with respect to the z-axis. If the third actuating arm is equipped with two rods, each of which is connected to the effector carrier via a third lower arm joint, the two third lower arm joints also preferably have exactly two geometric lower arm joint axes about which they are movable. Due to this feature, rotation of the effector carrier is already prevented by the third lower arm joints.

The planar motion or kinematics of the effector carrier is not overdetermined due to the particular design of the third actuating arm.

The shape of the working area has the advantage that several industrial robots of the same type can be arranged next to each other in the immediate vicinity without interfering with each other and without the need to prevent a collision of the actuating arms of adjacently arranged industrial robots by means of an appropriate control system. This makes it possible to arrange several industrial robots according to the invention along a transport route at a short distance.

According to an advantageous embodiment of the invention, the effector carrier is secured against rotation about the z-axis exclusively by the third actuating arm. In this case, the first actuating arm and the second actuating arm do not contribute to securing the effector carrier against rotation with respect to the z-axis.

According to another advantageous embodiment of the invention, the end of the elongated arm section of the third actuating arm facing the robot base is provided with a joint that is movable about exactly two geometric axes. This increases the torsional rigidity of the third actuating arm with respect to the z-axis. The joint is preferably designed as a cardan joint. If the third arm drive is stationary and immovably arranged on the robot base and the elongated arm section is movably coupled to a drive axis of the third arm drive, the joint is designed as a third elbow joint that connects the elongated arm section to the drive axis of the third arm drive directly or via an additional third upper arm. If the third arm drive is designed as a linear drive, it can be movably accommodated on the robot base via the joint. In this case, the drive axis of the linear actuator is directly connected to the elongated arm section of the third actuating arm.

According to another advantageous embodiment of the invention, one of the two lower arm joint axes about which the third lower arm joint is movable is perpendicular to a longitudinal axis of the elongate arm section of the third actuating arm. The other lower arm joint axis is parallel to or extends in the effector carrier plane.

According to another advantageous embodiment of the invention, the first actuating arm is connected to the first upper arm via two first elbow joints and to the effector carrier via two first lower arm joints. In this case, the two first lower arm joints are arranged spatially offset on the effector carrier. In this case, the first actuating arm ensures acceleration of the effector carrier in the direction of the x-axis and at the same time prevents rotation of the effector carrier about the x-axis.

According to a further advantageous embodiment of the invention, the second actuating arm is connected to the effector carrier via exactly one second lower arm joint. The third actuating arm is connected to the effector carrier via two third lower arm joints, which are arranged spatially offset on the effector carrier. In this case, the second actuating arm applies an accelerating force on the effector carrier in the direction of the y-axis. The third actuating arm prevents both rotation of the effector carrier about the z-axis and rotation of the effector carrier about the y-axis.

According to another advantageous embodiment of the invention, a first straight line connecting the centers of the two first lower arm joints intersects a straight line connecting the centers of the two third lower arm joints perpendicularly. This straight line may be referred to as the third straight line because it connects the two third lower arm joints together. In this case, the first lower arm joints and the third lower arm joints are arranged crosswise on the effector carrier.

According to another advantageous embodiment of the invention, the first actuating arm is connected to the effector carrier via two first lower arm joints and the second actuating arm is connected to the effector carrier via two second lower arm joints. The first lower arm joints and the second lower arm joints are arranged spatially offset on the effector carrier. The third actuating arm is connected to the effector carrier via exactly a third lower arm joint, which is movable about exactly two lower arm joint axes. In this case, the effector carrier is secured against rotation about the x-axis by the first actuating arm, against rotation about the y-axis by the second actuating arm, and against rotation about the z-axis by the third actuating arm.

According to another advantageous embodiment of the invention, a first straight line connects the centers of the two first lower arm joints perpendicularly intersects a second straight line connecting the centers of the two second lower arm joints. The two first lower arm joints and the two second lower arm joints are thus arranged crosswise on the effector carrier. The intersection point may be located at the edge of the effector beam or in the center of the effector beam, for example above the tool center point TCP. If the intersection point is located at the edge of the effector carrier, the rods or struts of the first lower arm and the rods or struts of the second lower arm cannot interfere with each other during a movement of the effector carrier.

According to another advantageous embodiment of the invention, a third straight line, which is perpendicular to the effector carrier plane and passes through a center of the third lower arm joint, intersects the second straight line connecting the centers of the two second lower arm joints. Advantageously, the intersection point is located at the center of the effector carrier, for example above the TCP.

According to a further advantageous embodiment of the invention, the first straight line, the second straight line and the third straight line intersect at a point. This point is preferably located in the TCP or above the TCP.

According to a further advantageous embodiment of the invention, the first arm drive and the second arm drive are rotary drives. Here, a first drive axis of the first arm drive and a second drive axis of the second arm drive are substantially perpendicular to each other. This arrangement is suitable, for example, if the first lower arm joints of the first actuating arm and the second lower arm joints of the second actuating arm are arranged crosswise on the effector carrier or if the first actuating arm has two first lower arm joints and the second actuating arm has one second lower arm joint. In this case, the first drive axis is the axis driven by the first arm drive to which the first upper arm is connected in a rotationally fixed manner and via which the torque of the first arm drive is transmitted to the first upper arm. The drive axle can also be designed as a drive flange. The same applies to the second drive axis in relation to the second upper arm. The first drive axis and the second drive axis each rotate about a geometric axis. When the first drive axis is perpendicular to the second drive axis, the two associated geometric axes are perpendicular to each other.

According to a further advantageous embodiment of the invention, the third arm drive is a rotary drive. An upper arm of the third actuating arm is coupled to the rotary drive. This upper arm is hereinafter referred to as the third upper arm since it is the upper arm of the third actuating arm. The third upper arm is movably connected to the elongated arm section of the third actuating arm via a third elbow joint. Via the upper arm, the torque of the rotary drive is transmitted into a translational motion of the elongated arm section. The length of the upper arm may be in a particular relation to the length of the elongated arm section. In the case of a long upper arm, a small rotation angle of the third arm drive is sufficient to trigger a large z-stroke of the effector carrier. Here, z-stroke refers to a movement of the effector carrier in the direction of the z-axis. With a shorter upper arm, a larger angle of rotation of the third arm drive is required for the same z-stroke. The third elbow joint moves on a circular path when the third upper arm rotates. The longer the third upper arm, the larger the radius of this circular path. Advantageously, the length of the third upper arm and the length of the elongated arm section of the third actuating arm are selected so that the third upper arm and the elongated arm section are aligned substantially perpendicular to each other when the effector carrier is in the center of a working area defined by the range of motion of the first actuating arm, the second actuating arm, and the third actuating arm. This position of the effector carrier may be referred to as the initial position. Starting from this initial position, the third upper arm can be rotated by approximately 45° in one direction or the other by the third arm drive. A rotation in this angular range is not problematic for the third elbow joint. Cardan joints in particular can cover such an angular range.

According to a further advantageous embodiment of the invention, the third elbow joint has exactly two axes and thus two degrees of freedom. This increases the torsional stiffness of the third actuating arm with respect to the z-axis.

According to a further advantageous embodiment of the invention, the first drive axis and the second drive axis span a drive plane. A third drive axis of the third arm drive extends in this drive plane.

According to a further advantageous embodiment of the invention, the third drive axis extends perpendicular to the first drive axis or perpendicular to the second drive axis.

According to a further advantageous embodiment of the invention, the first arm drive and the second arm drive are linear drives.

According to a further advantageous embodiment of the invention, the third arm drive is a linear drive whose drive axis is connected to the elongated arm section of the third actuating arm via a joint that is movable about a plurality of axes. A drive axis of the linear actuator moves linearly along a geometric axis of motion. This linear motion of the drive axis is transmitted to the elongated arm section of the third actuating arm and from there to the effector carrier. The linear actuator may be stationary on the robot base. In this case, the drive axis is connected to the third elbow joint of the third actuating arm. The drive axis and third elbow joint move relative to the robot base. The linear actuator does not move relative to the robot base. Alternatively, the linear actuator may be movably received on the robot base via a third joint, which is preferably a cardan joint. In this case, the linear drive moves relative to the robot base. The drive axis of the linear actuator is directly connected to the elongated arm section of the third actuating arm.

According to another advantageous embodiment of the invention, the drive axis of the linear actuator is secured against rotation about an axis extending along the displacement path of the linear actuator. This increases the torsional rigidity of the third actuating arm with respect to the z-axis.

According to a further advantageous embodiment of the invention, the third lower arm joint is arranged above the effector carrier plane.

According to a further advantageous embodiment of the invention, a center of the third lower arm joint is located in the effector carrier plane.

According to a further advantageous embodiment of the invention, the first lower arm joint and the second lower arm joint are arranged laterally on the effector carrier. The third lower arm joint is arranged on the side of the effector carrier facing the robot base.

According to a further advantageous embodiment of the invention, the third lower arm joint is a cardan joint. This is characterized by the fact that it has exactly two axes, which are preferably perpendicular to each other. The center of the cardan joint corresponds to the point of intersection of the two axes. Cardan joints are also known as universal joints.

According to a further advantageous embodiment of the invention, the elongated arm section of the third actuating arm is provided with a cardan joint at its end facing away from the effector carrier. This cardan joint forms the third elbow joint of the third actuating arm.

According to a further advantageous embodiment of the invention, the elongated arm section of the third actuating arm is formed as an elongated hollow body.

According to a further advantageous embodiment of the invention, supply lines of an effector arranged on the effector carrier are accommodated in the elongated arm section. The joints with multiple degrees of freedom arranged on the elongated arm section may also have a hollow body, so that a continuous channel for the supply lines is formed up to the effector carrier.

According to a further advantageous embodiment of the invention, the industrial robot has an effector drive axis which moves an effector arranged on the effector carrier. This axis is also referred to as the fourth axis. The effector drive axis comprises an effector drive, which is arranged on the third actuating arm. For example, it may be arranged on the elongated arm section or on a third upper arm of the third actuating arm.

According to a further advantageous embodiment of the invention, the effector drive axis extends at least in sections in the elongate arm section of the third actuating arm.

According to a further advantageous embodiment of the invention, the arm drive of the third actuating arm is arranged externally on the robot base. Further, the at least one elbow joint of the third robotic arm points towards the center of the industrial robot and/or the center of the work area. This allows the elongated arm section of the third actuating arm to have limited tilt with respect to the x-/y-plane, and thus to transfer maximum torsional stiffness about the z-axis and, if necessary, also about the y-axis to the effector carrier. Furthermore, this arrangement allows sufficient space to be created in the center of the robot base for coaxial gear motors, which in turn makes it possible to arrange the drive axes perpendicular to one another. In comparison, in known delta robots, there is a need to either equip the arm drives with expensive angular gears or to arrange at least one of the drives offset in height on the robot base.

Further advantages and advantageous embodiments of the invention can be seen in the following description, the drawing and the claims.

DRAWING

Figure 2:
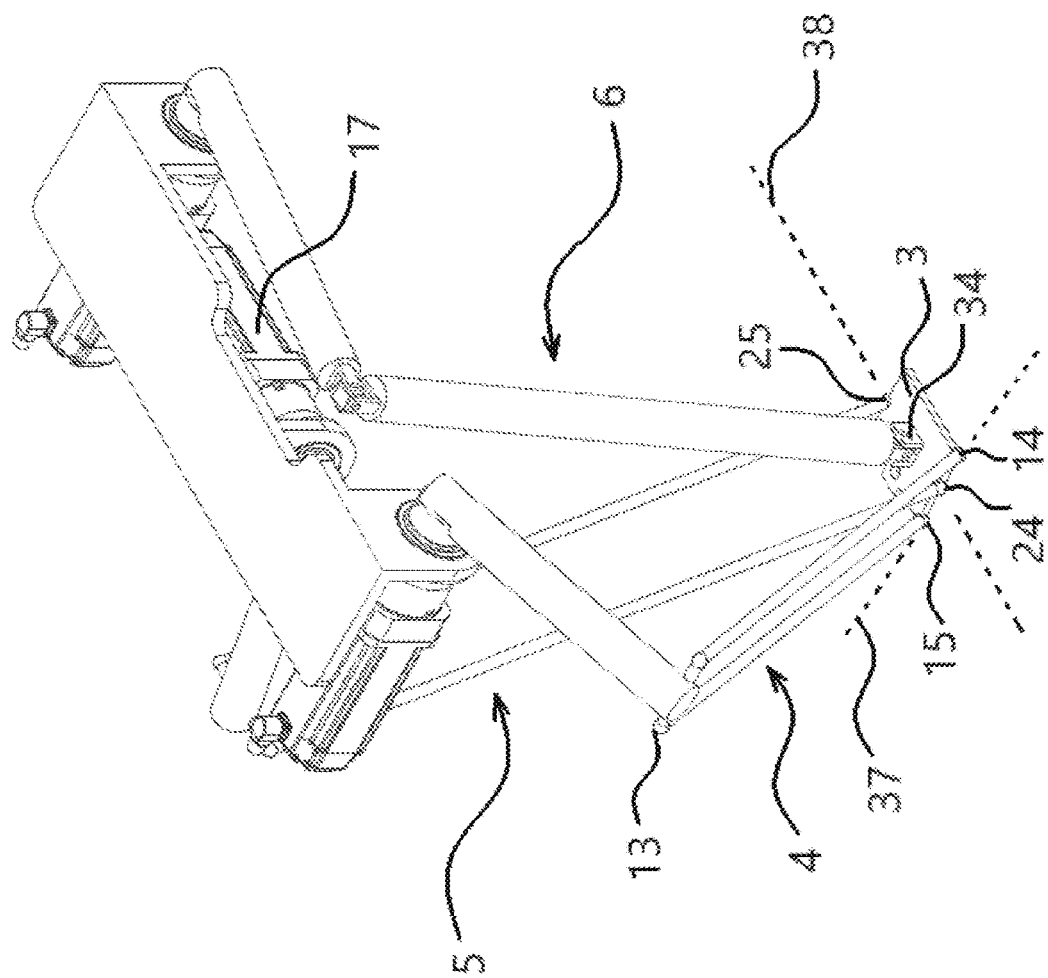
Figure 3:
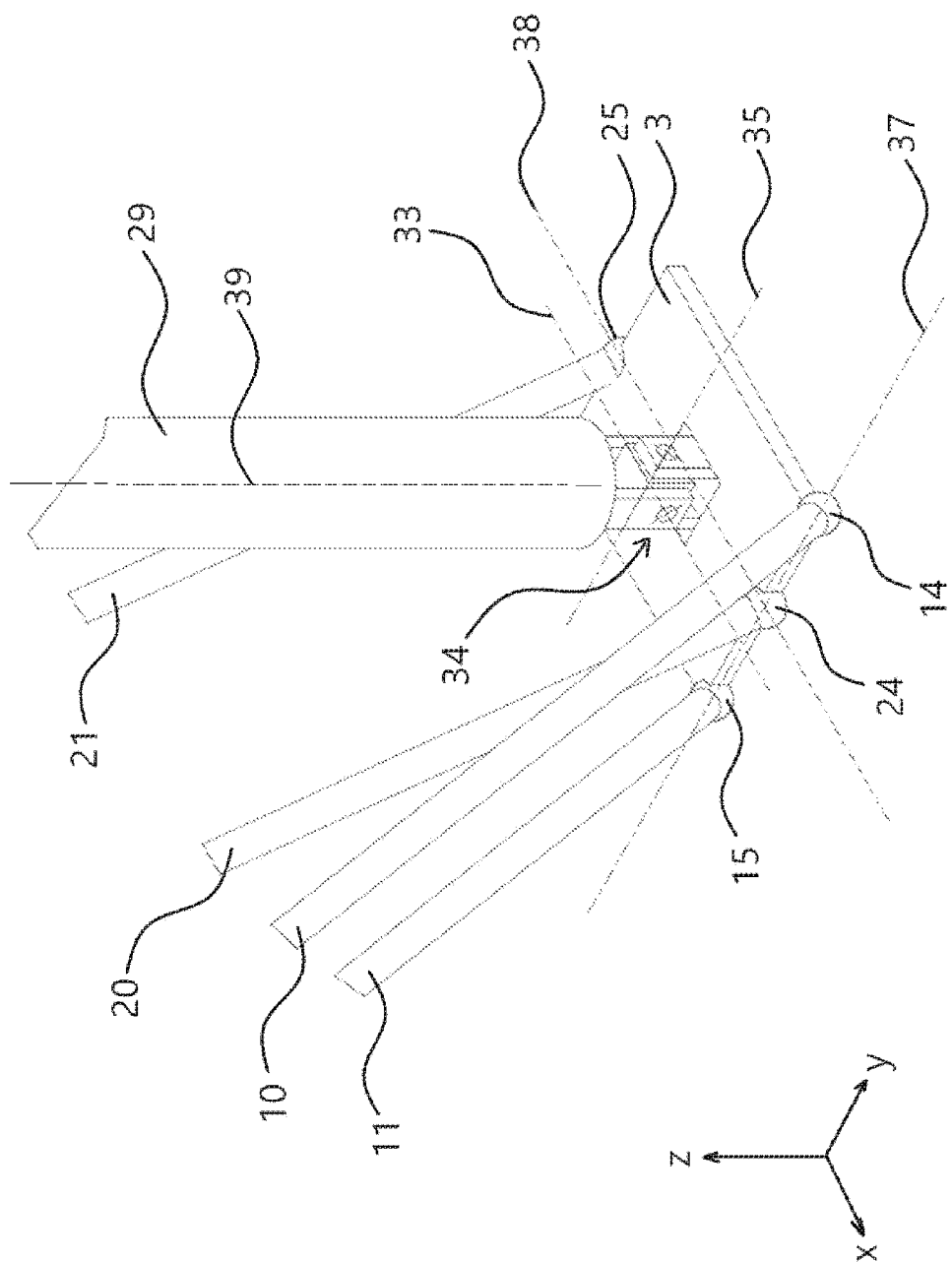
Figure 4:
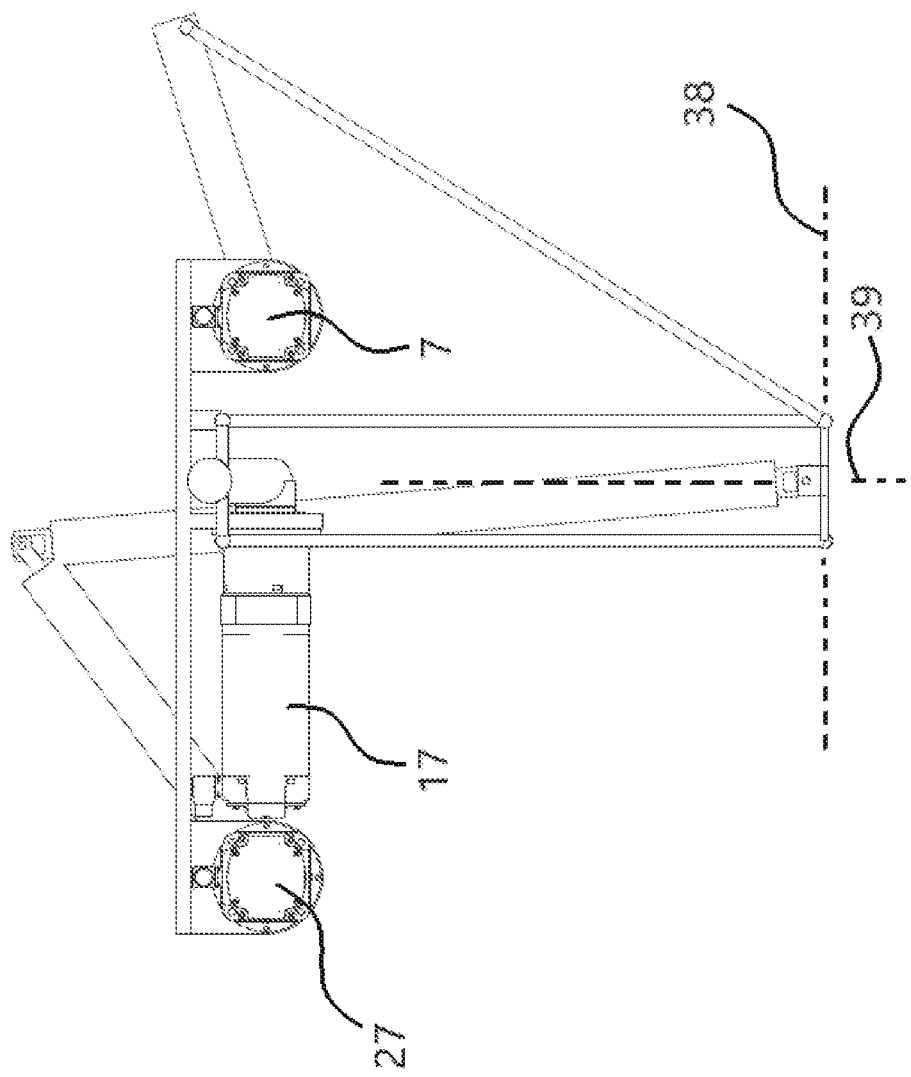
Figure 5:
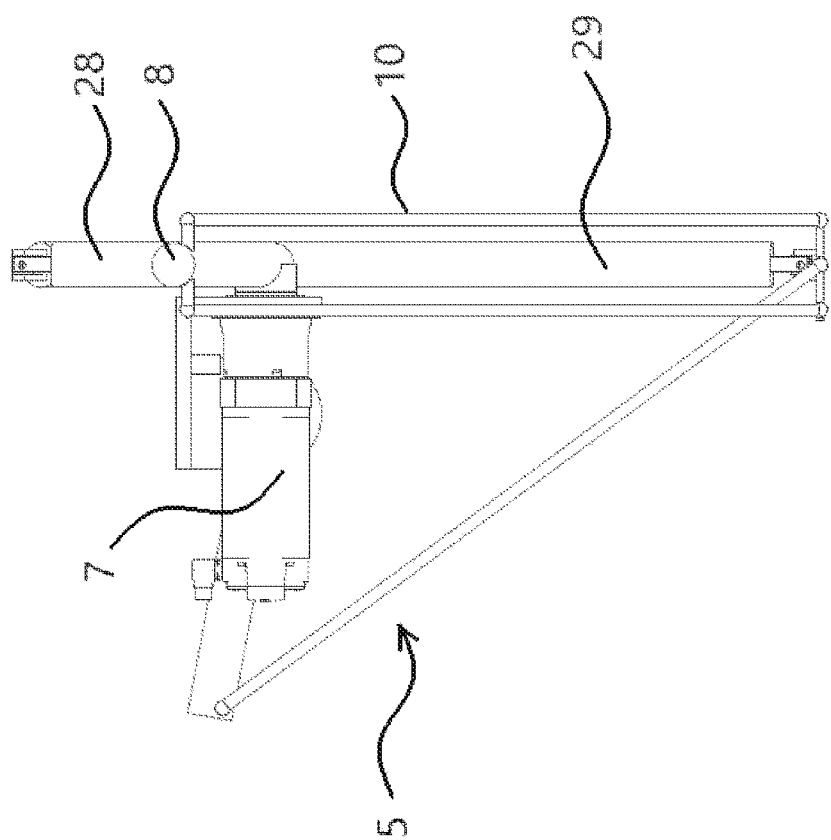
Figure 6:
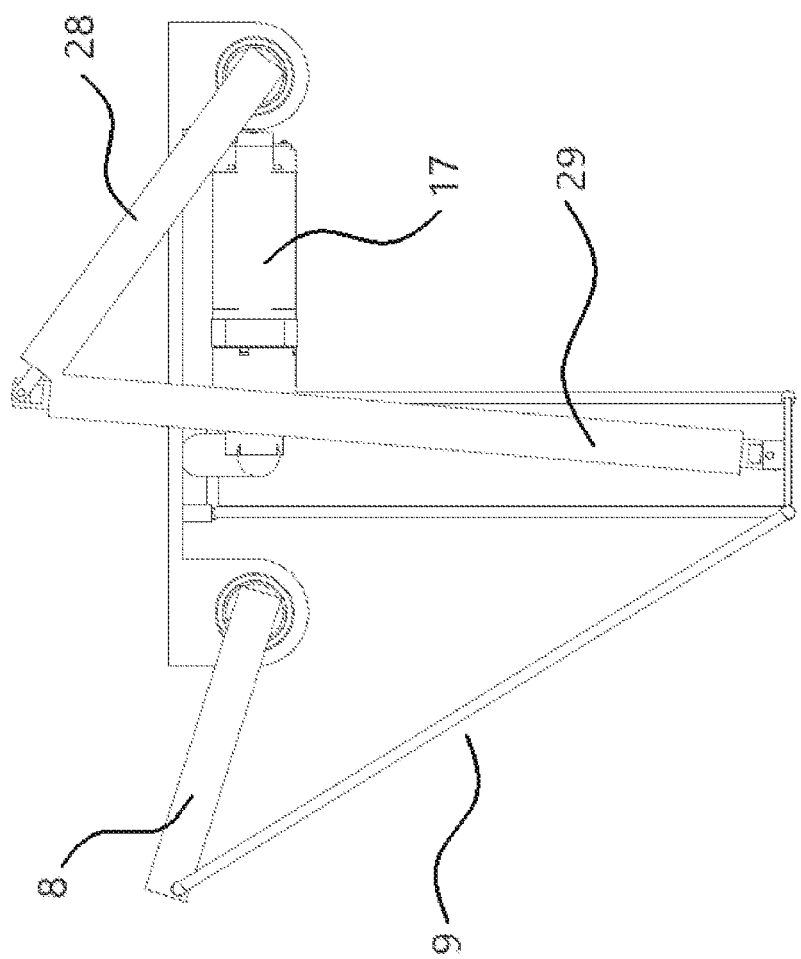
Figure 7:
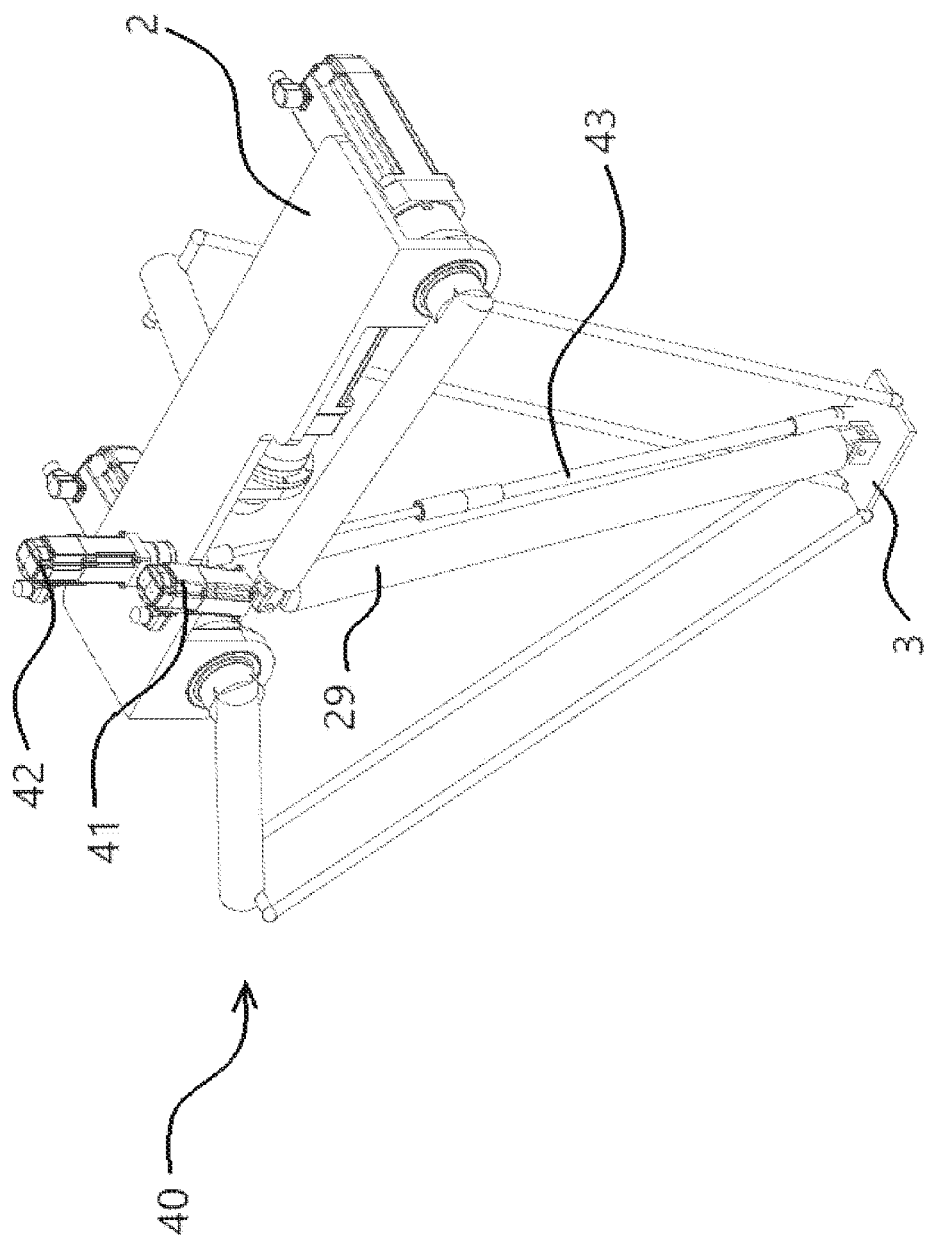
Figure 8:
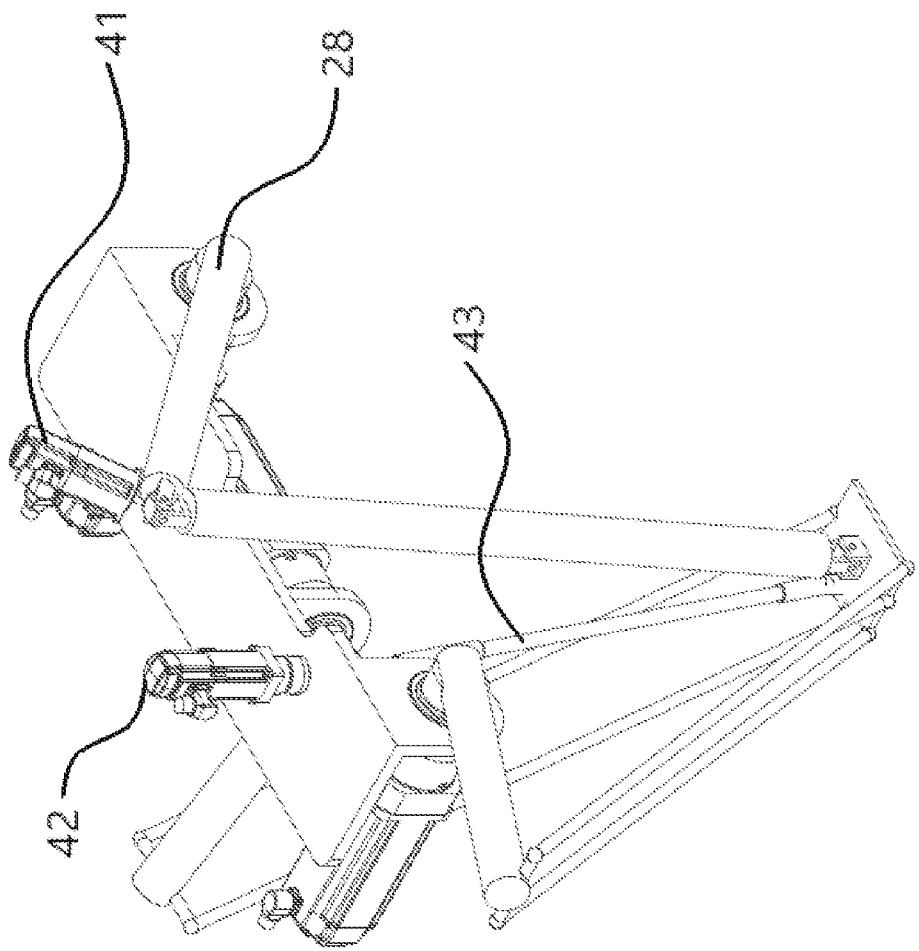
Figure 9:
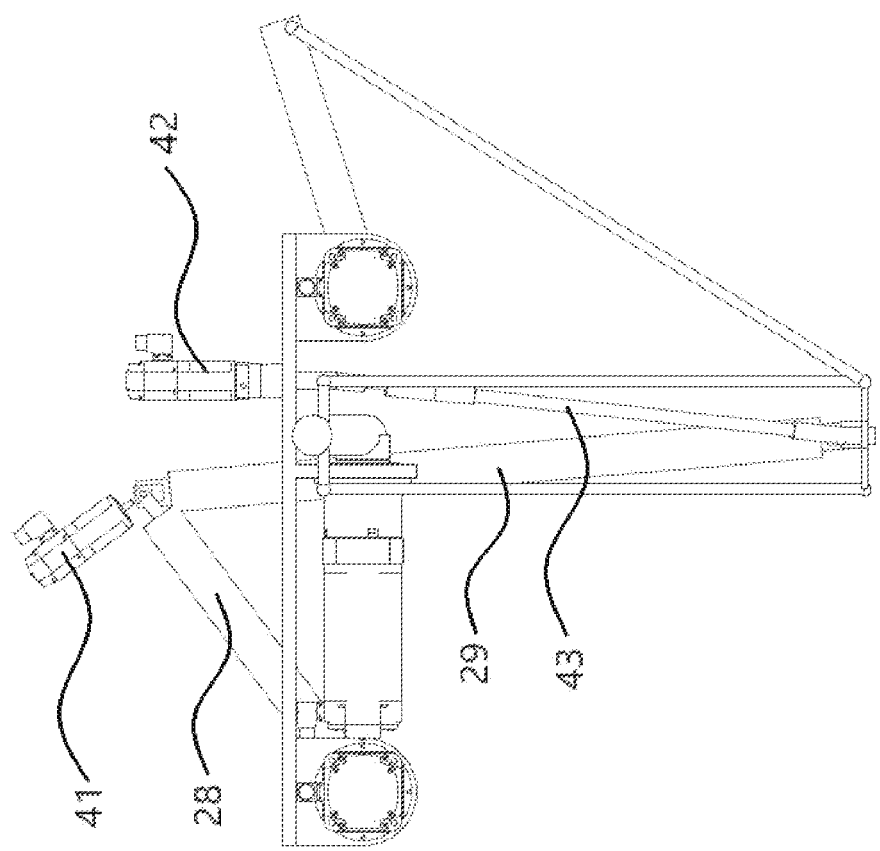
Figure 10:
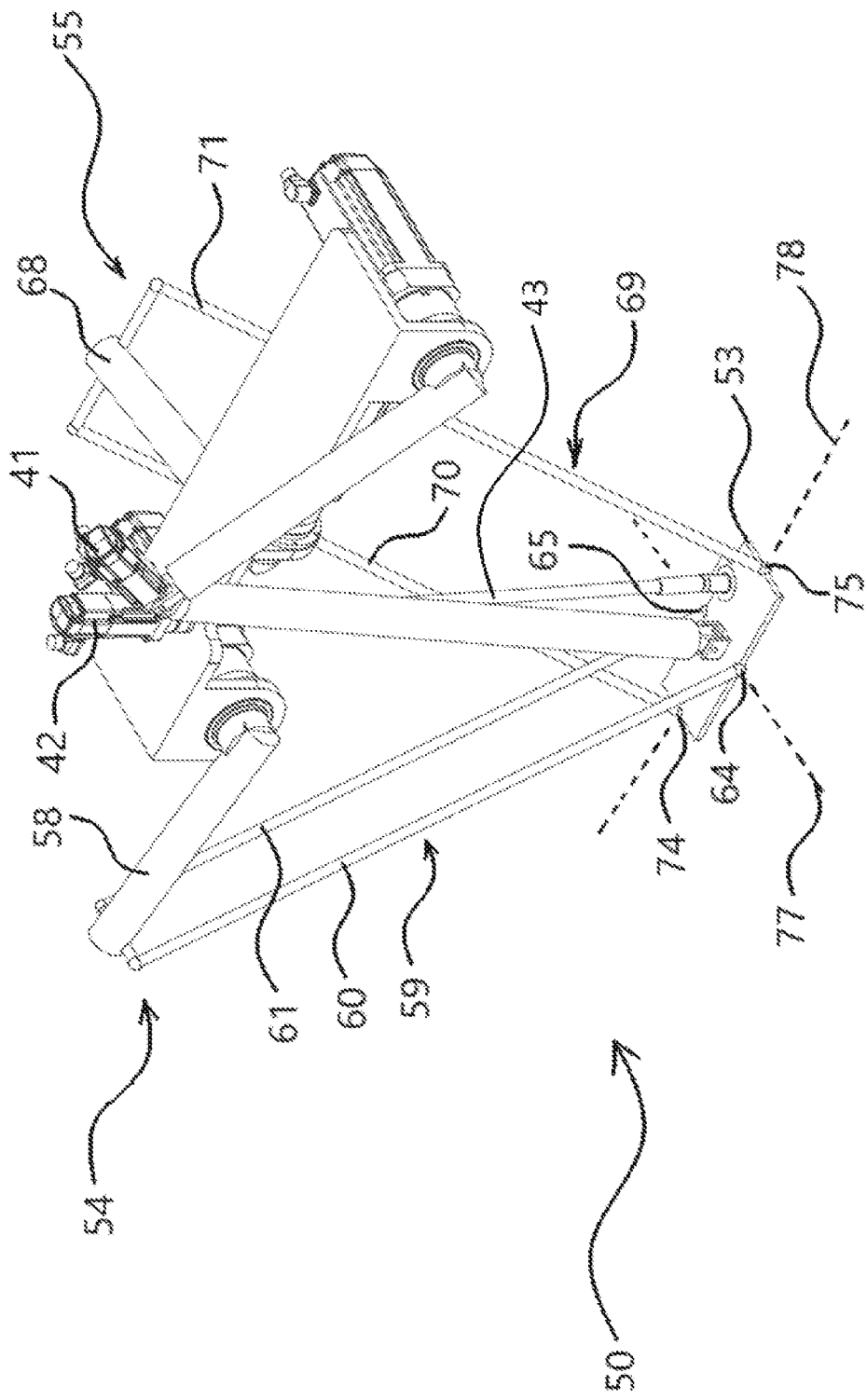
Figure 11:
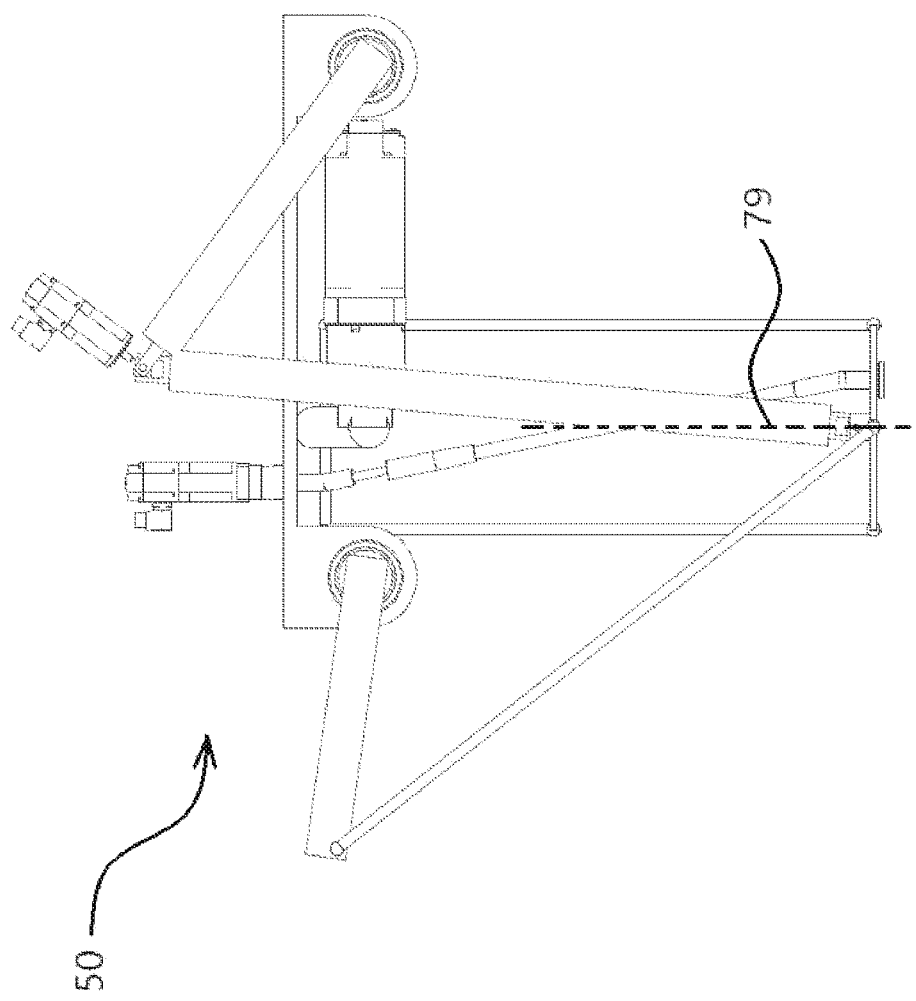
Figure 12:
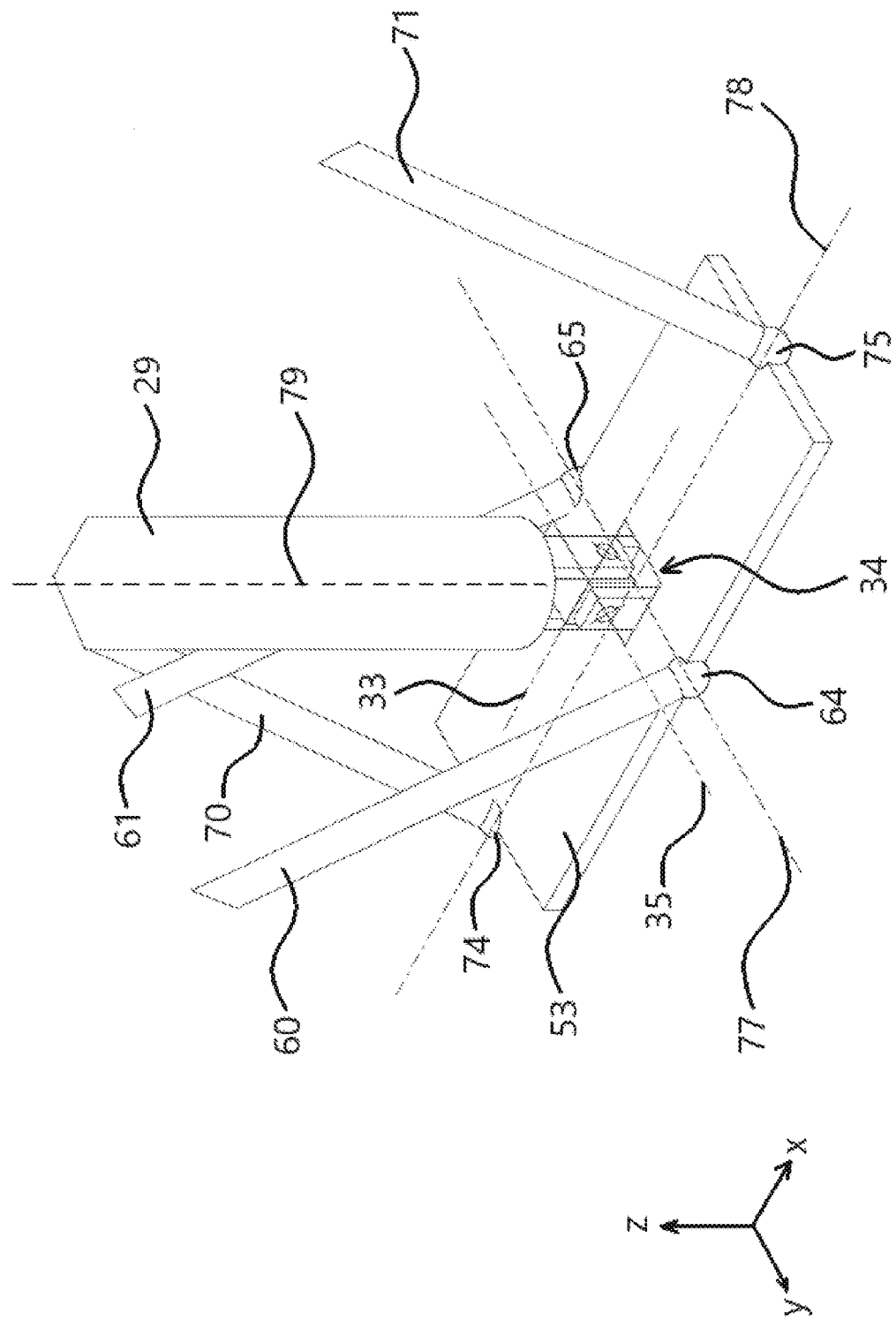
Figure 13:
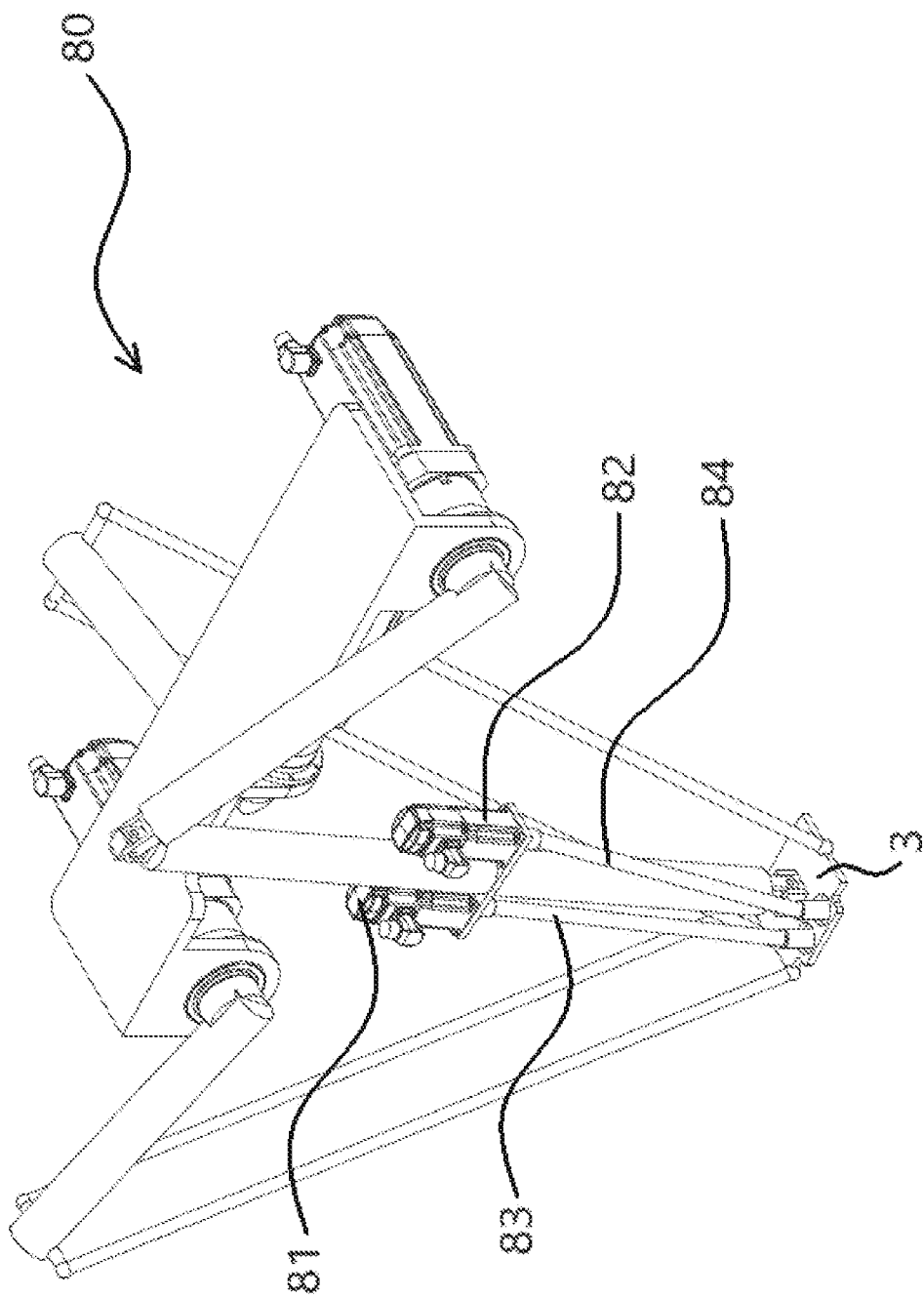
Figure 14:
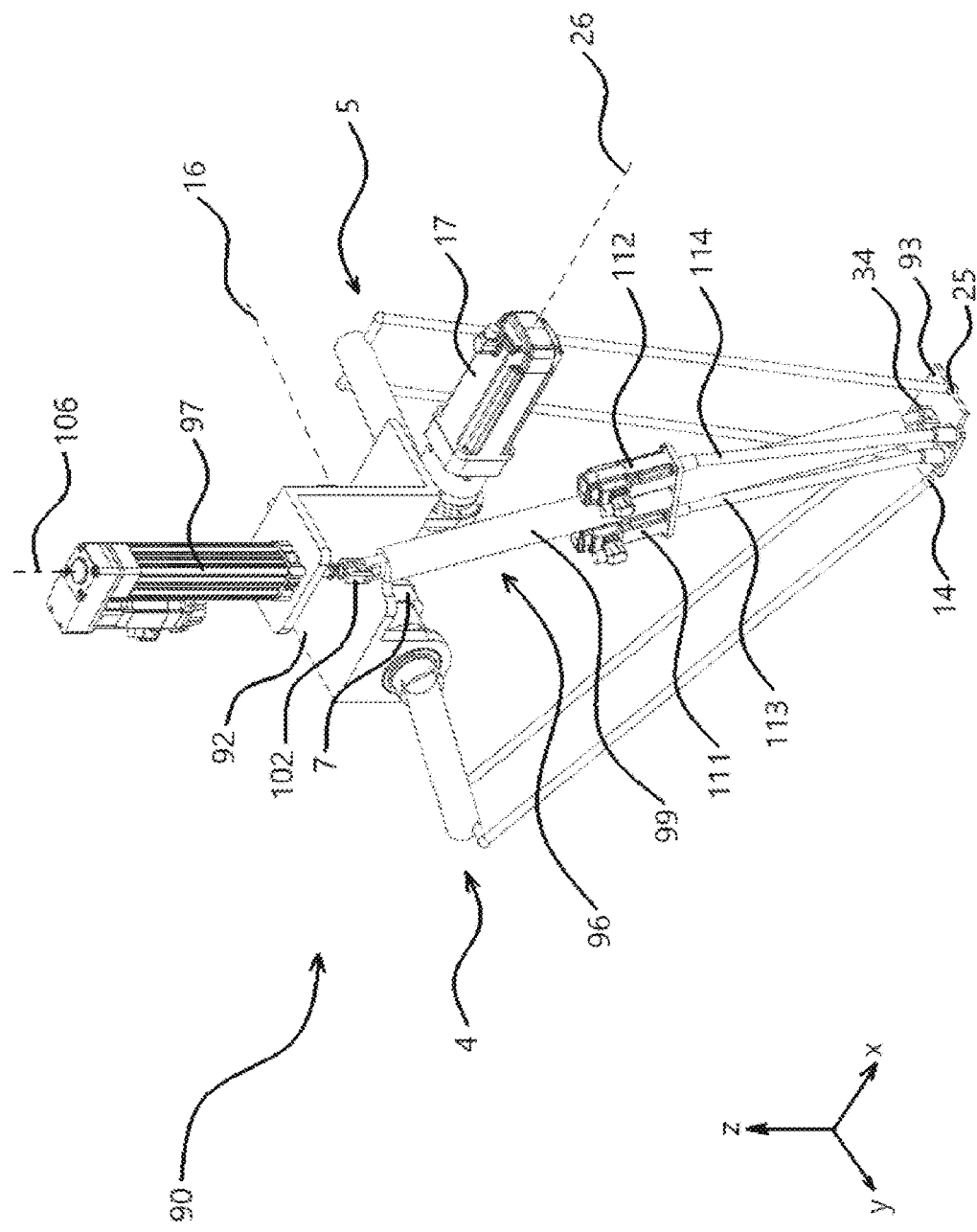
Figure 15:
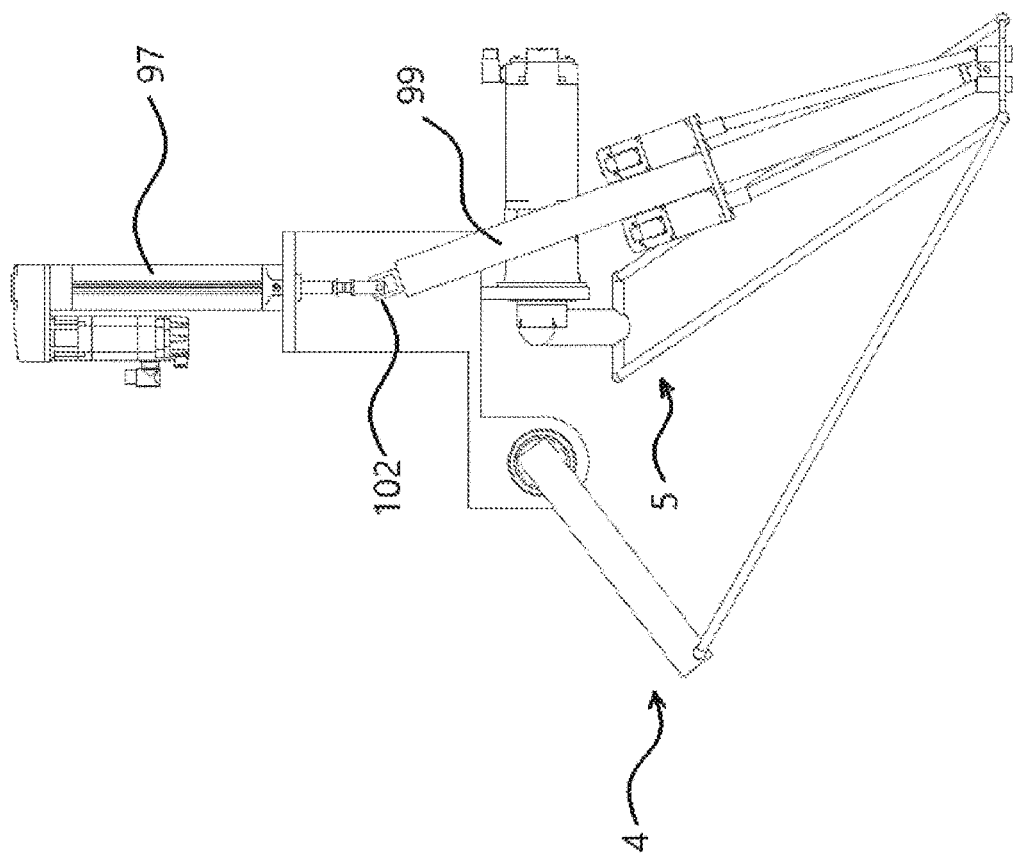
Figure 16:
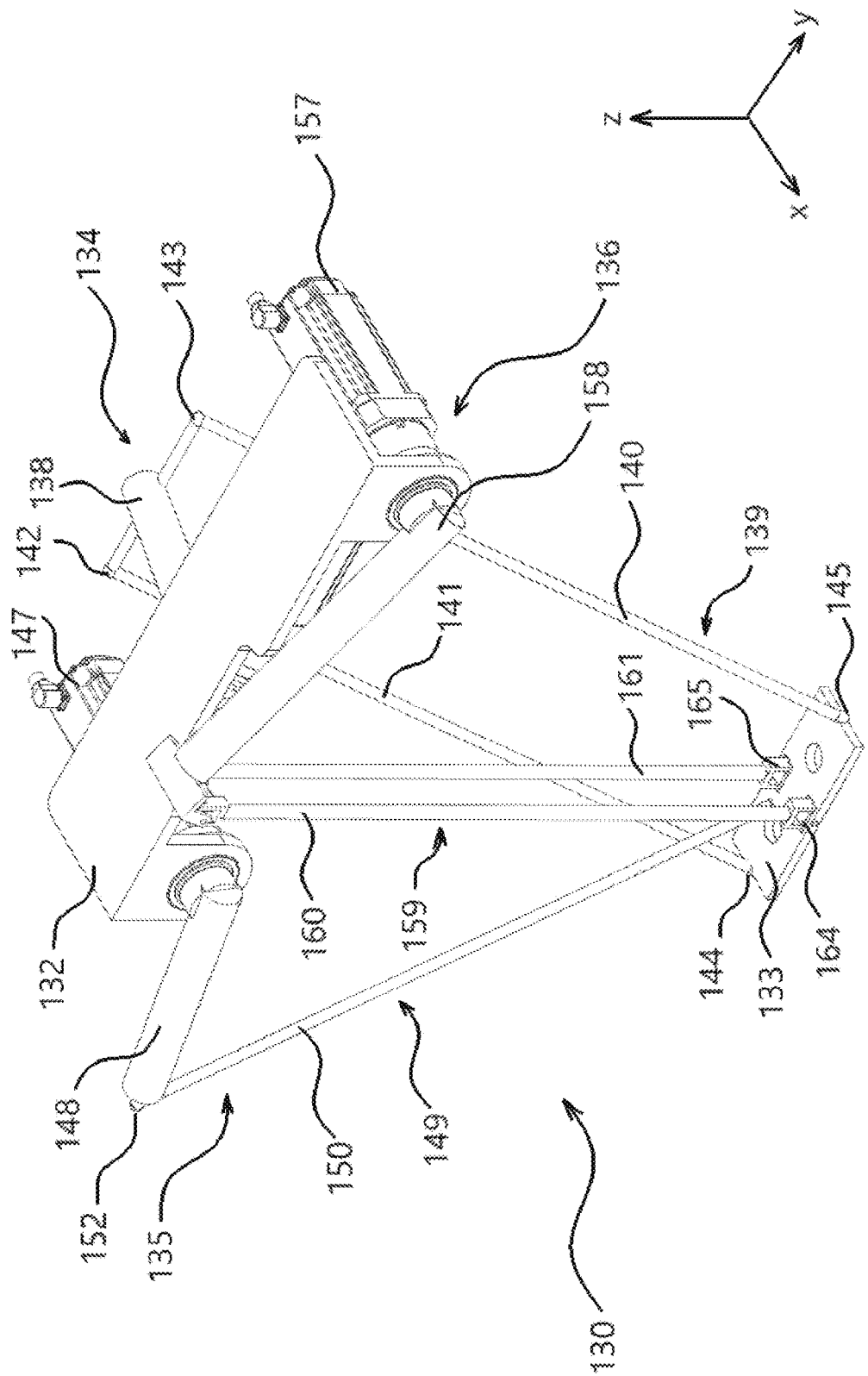
Figure 17:
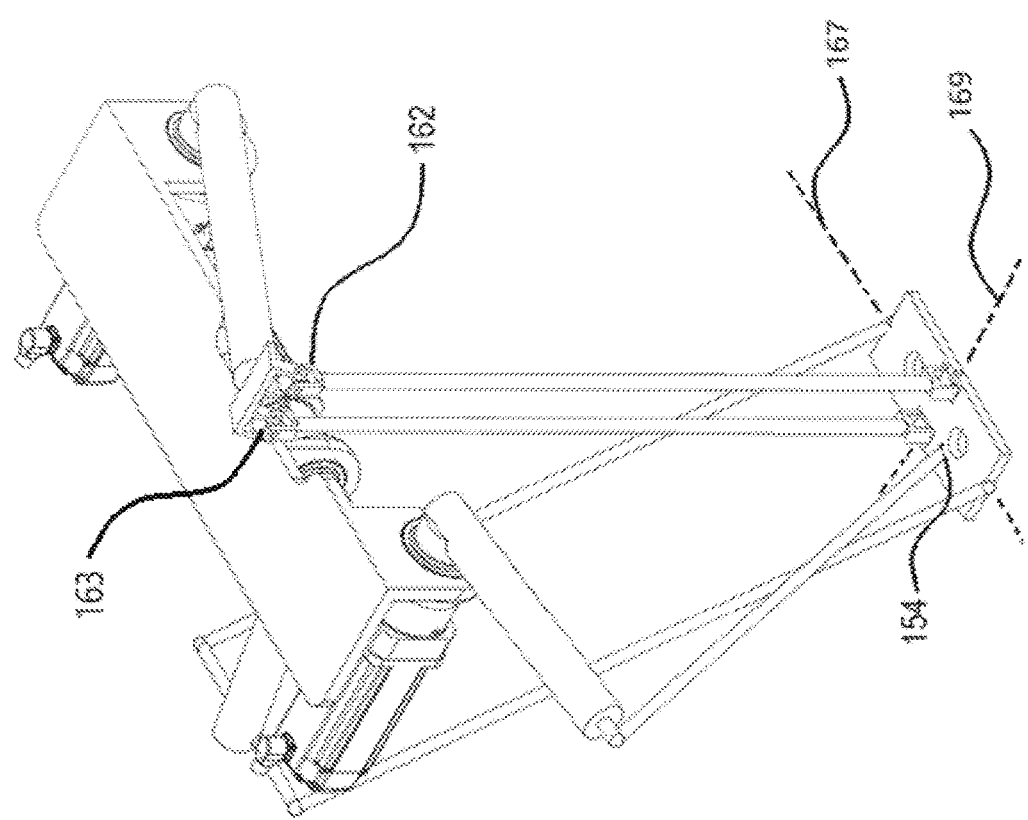
Figure 18:
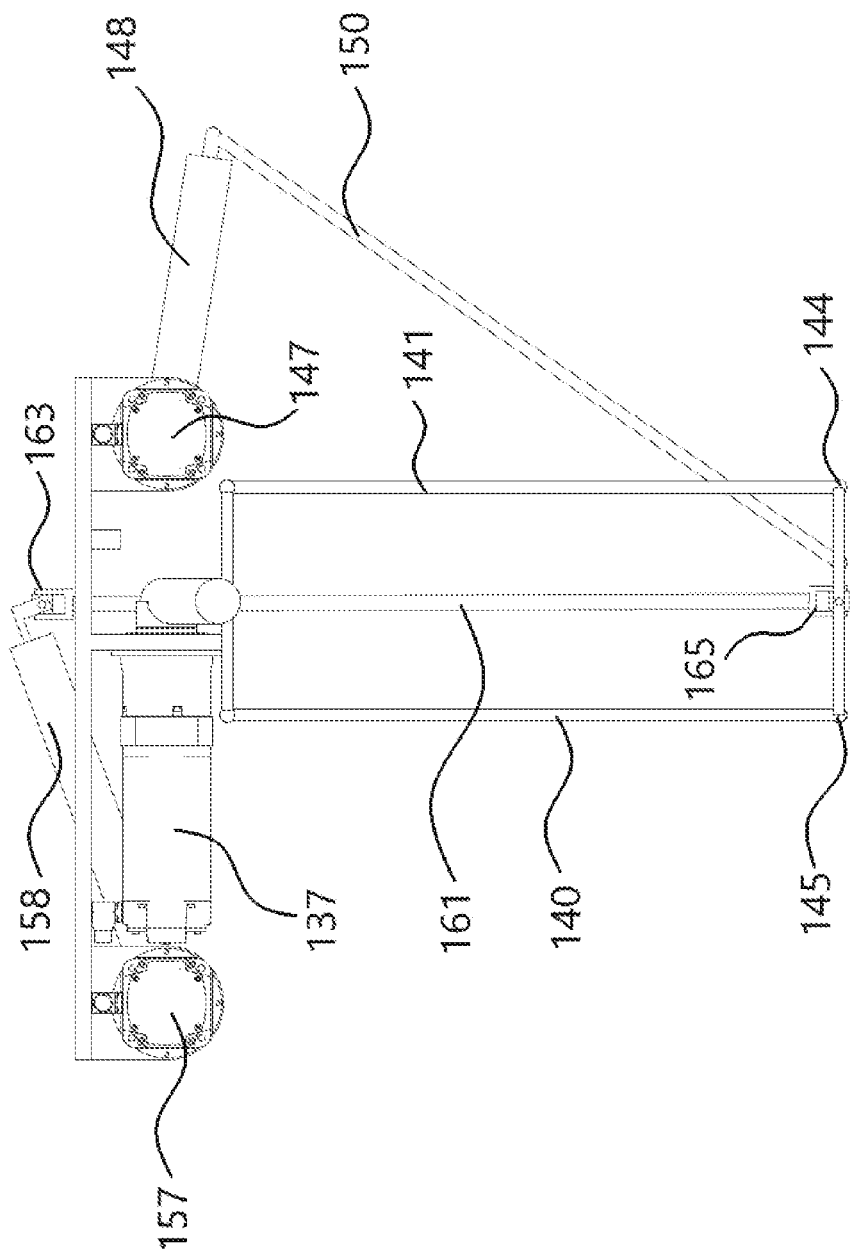
Figure 19:
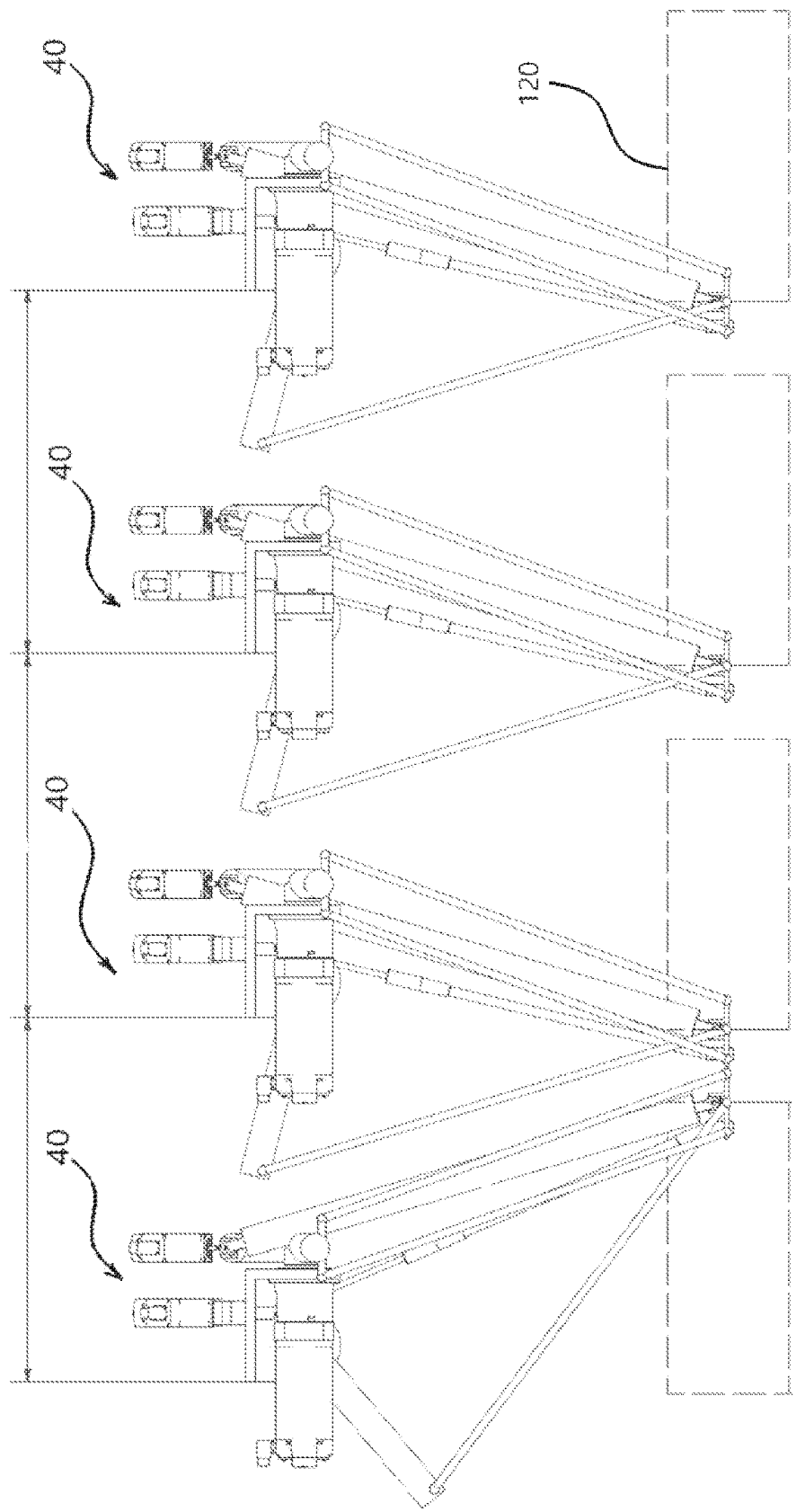

The drawing shows examples of embodiments of the invention. Illustrations:

FIG. 1 First embodiment of an industrial robot in perspective view,

FIG. 2 Industrial robot according to FIG. 1 in a further perspective view,

FIG. 3 Effector carrier of the industrial robot according to FIG. 1 in perspective view, FIG. 4 Industrial robot according to FIG. 1 in a side view, FIG. 5 Industrial robot according to FIG. 1 in a further side view, FIG. 6 Industrial robot according to FIG. 1 in a further side view, FIG. 7 Second embodiment of an industrial robot in perspective view, FIG. 8 Industrial robot according to FIG. 7 in a further perspective view, FIG. 9 Industrial robot according to FIG. 7 in a side view, FIG. 10 Third embodiment of an industrial robot in perspective view, FIG. 11 Industrial robot according to FIG. 10 in a side view, FIG. 12 Effector carrier of the industrial robot according to FIG. 10 in perspective view, FIG. 13 Fourth embodiment of an industrial robot in perspective view, FIG. 14 Fifth embodiment of an industrial robot in perspective view, FIG. 15 Industrial robot according to FIG. 14 in a side view, FIG. 16 Sixth embodiment of an industrial robot in perspective view, FIG. 17 Industrial robot according to FIG. 16 in a further perspective view, FIG. 18 Industrial robot according to FIG. 16 in a side view, FIG. 19 Side view of an arrangement of several industrial robots according to FIG. 7 in a row.

DESCRIPTION OF THE EMBODIMENTS

FIGS. 1 to 6 show a first embodiment of an industrial robot 1 with parallel kinematics. The industrial robot 1 comprises a robot base 2, an effector carrier 3, a first actuating arm 4, a second actuating arm 5, and a third actuating arm 6. The first actuating arm 4 includes a first arm drive 7, a first upper arm 8 connected to a drive axis of the first arm drive 7, and a first lower arm 9.

The first lower arm 9 comprises two parallel rods 10, 11. Each of the two rods 10, 11 is movably connected to the first upper arm 8 at its end facing the first upper arm 8 via a first elbow joint 12, 13. Furthermore, each of the two rods 10, 11 is connected to the effector carrier 3 at its end facing the effector carrier 3 via a first lower arm joint 14, 15. The first elbow joints 12, 13 and the first lower arm joints 14, 15 are formed as spherical joints. They have several degrees of freedom. When the first arm drive 7 transmits a rotary motion to the first upper arm 8, this rotary motion is transmitted to the effector carrier 3 via the two rods 10, 11 of the first lower arm 9.

The second actuating arm 5 has an identical structure as the first actuating arm 4, comprising a second arm drive 17, a second upper arm 18, a second lower arm 19 with two rods 20, 21, two second elbow joints 22, 23 and two second lower arm joints 24, 25. A rotational movement of the second arm drive 17 is transmitted to the effector carrier 3 via the second upper arm 18 and the second lower arm 19.

The first arm drive 7 and the second arm drive 17 are rotary drives. A first drive axis of the first arm drive 7 is driven for rotation about a first geometric axis 16. A second drive axis of the second arm drive 17 is driven for rotation about a second geometric axis 26. Here, the first arm drive 7 and the second arm drive 17 are arranged on the robot base such that the first geometric axis 16 and the second geometric axis 26 intersect perpendicularly. The first actuating arm 4 and the second actuating arm 5 thus provide a translatory movement of the effector carrier 3 in two dimensions, namely in the direction of an x-axis and in the direction of a y-axis orthogonal thereto. An xy-plane spanned by the x axis and the y axis is parallel to the effector carrier 3. When the effector carrier 3 is moved by the first, second and third actuating arms 4, 5, 6, the effector carrier 3 does not change its orientation relative to the xy-plane. It always remains parallel to it.

The third actuating arm 6 differs in structure from the first and second actuating arms 4, 5. The third actuating arm 6 has a third arm drive 27, which is arranged on the robot base 2. This is also a rotary drive. A third upper arm 28 is coupled to a drive axis of the third arm drive 27 in a rotationally fixed manner, so that a rotational movement of the third arm drive 27 is transmitted to the third upper arm 28. The third upper arm 28 is connected, via a third elbow joint 32, to an elongated arm section 29 that forms a lower arm of the third actuating arm 6. The elongated arm section 29 is connected to the effector carrier 3 via a third lower arm joint 34. The third elbow joint 32 and the third lower arm joint 34 are formed as a cardan joint. This has exactly two degrees of freedom. The cardan joint is connected to the effector carrier 3 in such a way that the elongated arm section 29 can tilt in two dimensions, namely in the x- and y-directions relative to the effector carrier. This allows the effector carrier 3 and the elongated arm section 29 coupled to the effector carrier 3 to follow a movement initiated by the first actuating arm 4 and the second actuating arm 5. However, rotation of the effector carrier 3 about a z-axis orthogonal to the x-axis and the y-axis is precluded thanks to the third lower arm joint 34, which is in the form of a cardan joint. The z-axis is perpendicular to the xy-plane and is thus perpendicular to the effector carrier 3.

The third arm drive 27 is also a rotary drive. A drive axis of the third arm drive 27, which will be referred to herein as the third drive axis, is driven for rotation about a third geometric axis 36. The first geometric axis 16 of the first arm drive 7, the second geometric axis 26 of the second arm drive 17 and the third geometric axis 36 of the third arm drive 27 all run in a common plane. Here, the first geometric axis 16 and the third geometric axis 36 are parallel to each other. The second geometric axis 26 runs perpendicular to the first geometric axis 16 and to the third geometric axis 36.

A movement of the third arm drive 27 causes the third upper arm 28 to rotate about the third geometric axis 36.

This movement is transmitted to the effector carrier 3 via the third elbow joint 32, the elongated arm section 29 and the third lower arm joint 34. It results in a translational movement of the effector carrier 3 in the direction of the z-axis.

FIG. 3 shows the effector carrier with the first lower arm joints 14, 15, the second lower arm joints 24, 25 and the third lower arm joint 34. The two first lower arm joints 14, 15 of the first actuating arm 4 are connected to the effector carrier 3 in the lateral edge region. They are thereby seated at two corners of the rectangular effector carrier 3. A first straight line 37 runs through the center of the first lower arm joint 14 and through the center of the first lower arm joint 15. This first straight line 37 is parallel to one side of the rectangular effector carrier 3. It is parallel to the y-axis and perpendicular to the x-axis. The two second lower arm joints 24, 25 of the second actuating arm 5 are also connected to the effector carrier 3 at the lateral edge. Unlike the first lower arm joints 14, 15, however, the second lower arm joints 24, 25 are not located at two corners of the effector carrier 3, but at the side centers. A second straight line 38 passes through the center of the second lower arm joint 24 and through the center of the second lower arm joint 25. The second straight line 38 is parallel to one side of the rectangular effector carrier 3. It is parallel to the x-axis and perpendicular to the y-axis. The first straight line 37 intersects the second straight line 38 perpendicularly. The intersection of the two straight lines 37, 38 lies in the second lower arm joint 24. The first and second straight lines 37, 38 span a plane that is parallel to the xy-plane and to the effector carrier 3. It is referred to as the effector carrier plane. The third lower arm joint 34 is a cardan joint with two intersecting axes, referred to as lower arm joint axes. They can be seen in FIG. 3. A first of these two lower arm joint axes is rotatable about a geometric axis 33 which is perpendicular to a longitudinal axis of the elongate arm portion 29 of the third actuating arm. A second of these two lower arm joint axes is rotatable about a geometric axis 35 that is parallel to the effector carrier plane. The center of the third lower arm joint corresponds to the intersection of the two geometric axes 33 and 35. A third straight line 39, which is perpendicular to the effector carrier plane and passes through the center of the third lower arm joint 34, intersects the second straight line 38 perpendicularly. The third straight line is parallel to the z-axis. The second straight line 38 and the third straight line 39 intersect at the center of the effector carrier 3. This center is located above the TCP. The first straight line 37 does not pass through this center because the first lower arm joints 14, 15 are not arranged in the center of the sides of the effector carrier 3, but at the corners. This arrangement ensures that the two rods 10, 11 of the first actuating arm 4 do not collide with the two rods 20, 21 of the second actuating arm 5 when the effector carrier 3 is moved.

The first straight line 37 is parallel to the first geometric axis 16 of the first arm drive 7. The second straight line 38 is parallel to the second geometric axis 26 of the second arm drive 17. The third straight line 39 is perpendicular to the third geometric axis 36 of the third arm drive.

FIGS. 7 to 9 illustrate a second embodiment of an industrial robot 40. The industrial robot 40 is substantially the same as the industrial robot 1 of the first embodiment example shown in FIGS. 1 to 6, and therefore the same reference numerals are used for matching parts. The industrial robot 40 additionally has two effector drive axes for an effector arranged on the effector carrier 3, which is not shown in the drawing. For this purpose, a first effector drive 41 is arranged on the third upper arm 28 of the third actuating arm 6. It is part of a first effector drive axis. The torque of the first effector drive 41 is transmitted to the effector carrier 3 via a shaft which runs in the elongated arm section 29 of the third actuating arm 6. It is therefore not visible in the drawing. A second effector drive shaft comprises a second effector drive 42 arranged on the robot base 2. The torque of the second effector drive 42 is transmitted to the effector carrier 3 via a shaft 43, which is not arranged in the elongated arm section 29 of the third actuating arm 6. It extends freely from the robot base 2 to the effector carrier 3 and is designed as a telescopic shaft so that it can follow the movement of the effector carrier 3.

FIGS. 10 to 12 show a third embodiment of an industrial robot 50. It is substantially similar to the industrial robot 40 according to FIGS. 7 to 9 and also has a first and a second effector drive 41, 42. Matching parts therefore have the same reference numerals. The third actuating arm 6 matches the third actuating arm of the industrial robot 1 according to FIGS. 1 to 6. The difference with the industrial robot 1 and the industrial robot 40 is that the first lower arm joints 64, 65 of the first actuating arm 54 are not arranged at the corners of the effector carrier 53 but in the middle of the sides of the effector carrier 53 just like the second lower arm joints 74, 75 of the second actuating arm 55. FIG. 12 shows the effector carrier 53 of the industrial robot 50 with the first lower arm joints 64, 65, the second lower arm joints 74, 75 and the third lower arm joint 34. For clarity, the shaft 43 of the second effector drive 42 is not shown in FIG. 12. The lower arm joints 64, 65, 74, 75 are arranged crosswise on the effector carrier 53. This results in a first straight line 77, which passes through the centers of the first two lower arm joints 64, 65, and a second straight line 78, which passes through the centers of the second two lower arm joints 74, 75, intersecting at the center of the effector carrier 53. The point of intersection is immediately in or at the third lower arm joint 34. The first straight line 77 and the second straight line 78 span a plane referred to as the effector carrier plane. The first straight line 77 is perpendicular to the x-axis and parallel to the y-axis. The second straight line 78 is parallel to the x-axis and perpendicular to the y-axis. Consistent with FIG. 3, the third lower arm joint 34 has two intersecting lower arm joint axes that are rotatable about two geometric axes 33, 35. The center of the third lower arm joint 34 corresponds to the intersection of the geometric axes 33 and 35. A third straight line 79 is perpendicular to the effector carrier plane of the first straight line 77 and the second straight line 78 and passes through the center of the third lower arm joint 34. The third straight line 79 intersects the first straight line 77 and the second straight line 78. All three straight lines 77, 78, 79 intersect at a point. This point is located above the TCP. To prevent the rods 60, 61 of the first actuating arm 54 from colliding with the rods 70, 71 of the second actuating arm 55, the rods 70, 71 of the second actuating arm 55 are arranged at a greater distance on the second upper arm 68 than the rods 60, 61 of the first actuating arm 54 on the first upper arm 58.

FIG. 13 shows a fourth embodiment of an industrial robot 80, which is substantially the same as the industrial robot 1 shown in FIGS. 1 to 5. The same reference numerals have been used for matching parts. The industrial robot 80 differs from the industrial robot 1 in that two effector drives 81, 82 are arranged on the elongated arm section 29 of the third actuating arm 6. The two effector drives 81, 82 are thereby attached laterally to the elongated arm section 29. The torque of the effector drives 81, 82 is guided to the effector carrier 3 via two shafts 83, 84. An effector arranged on the effector carrier 3 can be connected there to the two shafts 83, 84. The effector is not shown in the drawing.

FIGS. 14 and 15 show a fifth embodiment of an industrial robot 90. The first actuating arm 4 and the second actuating arm 5 of the industrial robot 90 as well as the arrangement of the first lower arm joints, the second lower arm joints and the third lower arm joint 34 are identical to the industrial robot 1 according to FIGS. 1 to 6. In FIG. 14, only the first lower arm joint and the second lower arm joint 25 can be seen. The same reference numerals have been used for the matching parts. The industrial robot 90 differs from the industrial robot 1 with respect to the third actuating arm 96. The third arm drive 97 of the third actuating arm 96 is a linear actuator. The third arm drive 97 is disposed on the robot base 92. A drive axis of the linear actuator is moved along the geometric movement axis 106. The linear motion of the drive axis is transmitted via a third elbow joint 102 to the elongated arm section 99 of the third actuating arm 96, and from there to the effector carrier 93. This results in linear movement of the effector carrier 93 in the direction of the z-axis. The third elbow joint 102 is designed as a cardan joint. In accordance with the industrial robots 1, 40, 50 and 80, the third actuating arm 96 is connected to the effector carrier 93 via a third lower arm joint 34 designed as a cardan joint. The entire third actuating arm 96 is secured against rotation about the z-axis. This applies to the third arm drive 97 designed as a linear drive, the third elbow joint 102, the elongated arm section 99, the third lower arm joint 34 and attachment of the third lower arm joint 34 to the effector carrier 93. A rotation of the effector carrier 93 about the z-axis is thus excluded. The geometric axis of motion 106 is perpendicular to the plane spanned by the first geometric axis 16 of the first arm drive 7 of the first actuating arm 4 and by the second geometric axis 26 of the second arm drive 17 of the second actuating arm 5. In accordance with the industrial robots 1, 40, 50 and 80, the first arm drive 7 and the second arm drive 17 are designed as rotary drives. Like the industrial robot 80 in FIG. 13, the industrial robot 90 has two effector drive axes. For this purpose, two effector drives 111, 112 are arranged on the elongated arm section 99 of the third actuating arm 96. The two effector drives 111, 112 are thereby attached laterally to the elongated arm section 99. The torque of the effector drives 111, 112 is guided to the effector carrier 93 via two shafts 113, 114. An effector arranged on the effector carrier 93 can be connected there to the two shafts 113, 114. The effector is not shown in the drawing.

FIGS. 16 to 18 illustrate a sixth embodiment of an industrial robot 130 having a robot base 132, an effector carrier 133, a first actuating arm 134, a second actuating arm 135, and a third actuating arm 136. The first actuating arm 134 includes a first arm drive 137, a first upper arm 138 connected to a drive axis of the first arm drive 137, and a first lower arm 139. The first lower arm 139 includes two parallel rods 140, 141. Each of the two rods 140, 141 is movably connected to the first upper arm 138 at its end facing the first upper arm 138 via a first elbow joint 142, 143. Further, each of the two rods 140, 141 is movably connected at its end facing the effector carrier 133 to the effector carrier 133 via a first lower arm joint 144, 145. The first elbow joints 142, 143 and the first lower arm joints 144, 145 are formed as spherical joints. They have multiple degrees of freedom.

The second actuating arm 135 has a second arm drive 147, a second upper arm 148, a second lower arm 149 with only one rod 150. This rod 150 is connected to the second upper arm 148 via a second elbow joint 152 and to the effector carrier 133 via a second lower arm joint 154. The second elbow joint 152 and the second lower arm joint are spherical joints.

The third actuating arm 136 includes a third arm drive 157, a third upper arm 158, and an elongated arm section 159 formed by two rods 160, 161. Each of the two rods 160, 161 is connected to the third upper arm 158 via a third elbow joint 162, 163 and to the effector carrier 133 via a third lower arm joint 164, 165. The two third elbow joints 162, 163 and the two lower arm joints 164, 165 are formed as cardan joints. Each of these joints has two geometric joint axes about which it is movable.

The number of all lower arm joints of the first actuating arm 134, the second actuating arm 135 and the third actuating arm 136 is thus five, as in the previous embodiments.

A first straight line 167 extending through the centers of the first two lower arm joints 144, 145 perpendicularly intersects a third straight line 169 extending through the centers of the third two lower arm joints 164, 165.

The advantage of the industrial robot according to the sixth embodiment over the previous embodiments is that the rods 140, 141 of the first lower arm 139, the rod 150 of the second lower arm 149 and the rods 160, 161 of the elongated arm section 159 of the third actuating arm interfere less with each other when the effector carrier moves, since they do not come as close as in the other embodiments.

FIG. 19 shows four industrial robots 40 according to the second embodiment example in a side-by-side arrangement. The distance between each two adjacent industrial robots 40 is the same in each case. In the area of the effector carriers, the rectangular working areas 120 of the industrial robots 40 are shown by dashed rectangles. The first and the second industrial robot from the left are set with their effector carriers in such a way that both effector carriers are located at the edge of the working area assigned to them in the immediate vicinity. Nevertheless, the actuating arms and the effector carriers of the two industrial robots do not collide. The illustration shows that the industrial robots can be arranged very close to each other or behind each other without the working areas of the actuating arms overlapping. Collision can thus be ruled out without the need for a special control system for this purpose.

All features of the invention can be essential to the invention either individually or in any combination with each other.

REFERENCE FIGURES

1 Industrial robot
2 Robot base
3 Effector carrier
4 First actuating arm
5 Second actuating arm
6 Third actuating arm
7 First arm drive
8 First upper arm
9 First lower arm
10 Rod
11 Rod
12 First elbow joint
13 First elbow joint
14 First lower arm joint
15 First lower arm joint
16 First geometric axis
17 Second arm drive
18 Second upper arm
19 Second lower arm
20 Rod
21 Rod
22 Second elbow joint 23 Second elbow joint
24 Second lower arm joint
25 Second lower arm joint
26 Second geometric axis
27 Third arm drive
28 Third upper arm
29 Elongated arm section
32 Third elbow joint
33 Geometric axis of first lower arm joint axis
34 Third lower arm joint
35 Geometric axis of second lower arm joint axis
36 Third geometric axis
37 First straight line
38 Second straight line
39 Third straight line
40 Industrial robot
41 First effector drive
42 Second effector drive
43 Shaft
50 Industrial robot
53 Effector carrier
54 First actuating arm
55 Second actuating arm
58 First upper arm
59 First lower arm
60 Rod
61 Rod
64 First lower arm joint
65 First lower arm joint
68 Second upper arm
69 Second lower arm
70 Rod
71 Rod
74 Second lower arm joint
75 Second lower arm joint
77 First straight line
78 Second straight line
79 Third straight line
80 Industrial robot
81 Effector drive
82 Effector drive
83 Shaft
84 Shaft
90 Industrial robot
92 Robot base
93 Effector carrier
96 Third actuating arm
97 Third arm drive
99 Elongated arm section
102 Third elbow joint
106 Geometric axis of motion
111 Effector drive
112 Effector drive
113 Shaft
114 Shaft
120 Working area
130 Industrial robot
132 Robot base
133 Effector carrier
134 First actuating arm
135 Second actuating arm
136 Third actuating arm
137 First arm drive
138 First upper arm
139 First lower arm
140 Rod
141 Rod
142 First elbow joint
143 First elbow joint
144 First lower arm joint
145 First lower arm joint
147 Second arm drive
148 Second upper arm
149 Second lower arm
150 Rod
152 Second elbow joint
154 Second lower arm joint
157 Third arm drive
158 Third upper arm
159 Elongated arm section
160 Rod
161 Rod
162 Third elbow joint
163 Third elbow joint
164 Third lower arm joint
165 Third lower arm joint
167 First straight line
169 Third straight line

What is claimed is:

1. An industrial robot with parallel kinematics, the industrial robot comprising:
a robot base;
an effector carrier receiving an effector;
a first actuating arm;
a second actuating arm; and
a third actuating arm,
wherein each of the first actuating arm, the second actuating arm and the third actuating arm is driven and received at the robot base with one end respectively and movably connected at the effector carrier with another end respectively,
wherein the first actuating arm, the second actuating arm and the third actuating arm are configured to displace the effector carrier in a linear manner in three dimensions in space relative to the robot base,
wherein the first actuating arm includes a first arm drive arranged at the robot base, a first upper arm coupled to the first arm drive, and a first lower arm,
wherein the first lower arm is movably connected to the first upper arm by at least one first movable elbow joint and to the effector carrier by at least one first movable lower arm joint so that the first lower arm is movable about multiple geometric axes,
wherein the second actuating arm includes a second arm drive arranged at the robot base, a second upper arm coupled to the second arm drive and a second lower arm,
wherein the second lower arm is movably connected to the second upper arm by at least one second movable elbow joint and to the effector carrier by at least one second movable lower arm joint so that the second lower arm is movable about multiple geometric axes,
wherein the third actuating arm includes an elongated arm section which is directly or indirectly coupled at one end to a third arm drive of the third actuating arm and which is connected at its other end to the effector carrier by at least one third movable lower arm joint which is movable about two lower arm joint axes, and
wherein a sum of a number of the at least one first movable lower arm joint arranged at the effector carrier, the at least one second movable lower arm joint arranged at the effector carrier, and the at least one third movable lower arm joint arranged at the effector carrier is at least three and at most five, wherein centers of at least three of the first, second and third movable lower arm joints define an effector carrier plane and the effector carrier is secured against rotation about a z-axis oriented perpendicular to the effector carrier plane by the third actuating arm.

2. The industrial robot according to claim 1, wherein the effector carrier is secured against rotation about the z-axis exclusively by the third actuating arm.

3. The industrial robot according to claim 1, wherein one of two movable lower arm joint axes about which the at least one third lower arm joint is movable is perpendicular to a longitudinal axis of the elongated arm section of the third actuating arm, and wherein another lower arm joint axis of the third movable lower arm joint is parallel to or extends in the effector carrier plane.

4. The industrial robot according to claim 1, wherein the first arm drive and the second arm drive are rotary drives, wherein a first drive axis of the first arm drive and a second drive axis of the second arm drive are substantially perpendicular to each other.

5. The industrial robot according to claim 4, wherein the first drive axis and the second drive axis define a drive plane, and wherein a third drive axis of the third actuating arm extends in the drive plane.

6. The industrial robot according to claim 5, wherein the third drive axis is perpendicular to the first drive axis or perpendicular to the second drive axis.

7. The industrial robot according to claim 1, wherein the third arm drive is a rotary drive, wherein a third upper arm is coupled to the rotary drive and the third upper arm is movably connected to the elongate arm section of the third actuating arm by at least one third movable elbow joint so as to be movable about exactly two axes.

8. The industrial robot according to claim 1, wherein a center of the at least one third movable lower arm joint is located in the effector carrier plane.

9. The industrial robot according to claim 1, wherein the at least one third movable lower arm joint is a cardan joint.

10. The industrial robot according to claim 1, wherein the elongated arm section of the third actuating arm is configured as an elongated hollow body.

11. An industrial robot with parallel kinematics, the industrial robot comprising:
a robot base;
an effector carrier receiving an effector;
a first actuating arm;
a second actuating arm; and
a third actuating arm,
wherein each of the first actuating arm, the second actuating arm and the third actuating arm is driven and received at the robot base with one end respectively and movably connected at the effector carrier with another end respectively,
wherein the first actuating arm, the second actuating arm and the third actuating arm are configured to displace the effector carrier in a linear manner in three dimensions in space relative to the robot base,
wherein the first actuating arm includes a first arm drive arranged at the robot base, a first upper arm coupled to the first arm drive, and a first lower arm,
wherein the first lower arm is movably connected to the first upper arm by at least one first movable elbow joint and to the effector carrier by at least one first movable lower arm joint so that the first lower arm is movable about multiple geometric axes, wherein the second actuating arm includes a second arm drive arranged at the robot base, a second upper arm coupled to the second arm drive and a second lower arm,
wherein the second lower arm is movably connected to the second upper arm by at least one second movable elbow joint and to the effector carrier by at least one second movable lower arm joint so that the second lower arm is movable about multiple geometric axes,
wherein the third actuating arm includes an elongated arm section which is directly or indirectly coupled at one end to a third arm drive of the third actuating arm and which is connected at its other end to the effector carrier by at least one third movable lower arm joint which is movable about two lower arm joint axes, and
wherein a sum of a number of the at least one first movable lower arm joint arranged at the effector carrier, the at least one second movable lower arm joint arranged at the effector carrier, and the at least one third movable lower arm joint arranged at the effector carrier is at least three and at most five,
wherein centers of at least three of the first, second and third movable lower arm joints define an effector carrier plane and the effector carrier is secured against rotation about a z-axis oriented perpendicular to the effector carrier plane by the third actuating arm,
wherein the at least one third movable lower arm joint is movable about exactly two lower arm joint axes.

12. The industrial robot according to claim 11, wherein an x axis perpendicular to the z-axis and a y-axis perpendicular to the z-axis define an xy-plane which is parallel to or coincides with the effector carrier plane, wherein the first actuating arm applies an accelerating force to the effector carrier in a direction of a x-axis, wherein the second actuating arm applies an accelerating force on the effector carrier in a direction of a y-axis, and wherein the third actuating arm applies an accelerating force on the effector carrier in a direction of the z-axis.

13. The industrial robot according to claim 12, wherein the first actuating arm secures the effector carrier against rotation about the x-axis.

14. The industrial robot according to claim 12, wherein the third actuating arm secures the effector carrier against rotation about the z-axis and about the x-axis and about the y-axis.

15. The industrial robot according to claim 12, wherein the second actuating arm secures the effector carrier against rotation about the y-axis.

16. The industrial robot according to claim 11,
wherein the third actuating arm is structurally different from the first actuating arm and the second actuating arm, and
wherein the first actuating arm is connected to the first upper arm by two first movable elbow joints and to the effector carrier by two first movable lower arm joints, which are arranged spatially offset.

17. The industrial robot according to claim 16, wherein the second actuating arm is connected to the effector carrier by two movable second lower arm joints, which are arranged spatially offset, and wherein the third actuating arm is connected to the effector carrier by exactly one third movable lower arm joint, which is movable about exactly two lower arm joint axes.

18. The industrial robot according to claim 17, wherein a first straight line connecting the centers of the two first movable lower arm joints perpendicularly intersects a second straight line connecting the centers of the two second movable lower arm joints.

19. The industrial robot according to claim 18, wherein a straight line, which is perpendicular to the effector carrier plane and passes through the center of the third movable lower arm joint, intersects the second straight line.

20. The industrial robot according to claim 11, wherein the at least one third movable lower arm joint is arranged above the effector carrier plane.

21. The industrial robot according to claim 11, wherein the at least one first movable lower arm joint and the at least one second movable lower arm joint are arranged laterally on the effector carrier and wherein the at least one third movable lower arm joint is arranged on a side of the effector carrier facing the robot base.

22. The industrial robot according to claim 11, wherein the elongated arm section of the third actuating arm is provided with a movable cardan joint at its end facing away from the effector carrier.

\* \* \* \* \*